US012706061B2

(12) United States Patent
Ooishi et al.

(10) Patent No.: US 12,706,061 B2
(45) Date of Patent: Aug. 11, 2026

(54) DIMMING DEVICE AND DISPLAY DEVICE

(71) Applicant: Panasonic Automotive Systems Co., Ltd., Kanagawa (JP)

(72) Inventors: Yoshihisa Ooishi, Kanagawa Ken (JP); Shoichi Ishikawa, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 19/073,980

(22) Filed: Mar. 7, 2025

(65) Prior Publication Data

US 2025/0308469 A1 Oct. 2, 2025

(30) Foreign Application Priority Data

Mar. 29, 2024 (JP) ................................ 2024-055222

(51) Int. Cl.
*G09G 3/34* (2006.01)

(52) U.S. Cl.
CPC ... *G09G 3/3406* (2013.01); *G09G 2300/0823* (2013.01); *G09G 2310/08* (2013.01); *G09G 2320/0271* (2013.01); *G09G 2330/021* (2013.01)

(58) Field of Classification Search
CPC ......... G09G 3/3406; G09G 2300/0823; G09G 2310/08; G09G 2320/0271; G09G 2330/021; G09G 3/2022; G09G 3/3611; G02F 1/133; G02F 1/134336
See application file for complete search history.

(56) References Cited

U.S. PATENT DOCUMENTS 3,936,815 A * 2/1976 Kogure ............... G02F 1/13731 345/94
7,002,544 B2 2/2006 Sekido
2014/0368561 A1* 12/2014 Liao ..................... G09G 3/2014 345/692
2018/0151132 A1* 5/2018 Lee ...................... G09G 3/2018
2023/0341734 A1* 10/2023 Yang ................... G02F 1/13471
2024/0331651 A1* 10/2024 Ooishi .................... G02F 1/137
2025/0308481 A1* 10/2025 Ooishi ................. G09G 3/3696

FOREIGN PATENT DOCUMENTS

JP 2003-162262 6/2003
JP 2021-026222 2/2021
JP 2021-184062 12/2021

* cited by examiner

*Primary Examiner* — Temesghen Ghebretinsae
*Assistant Examiner* — Sosina Abebe
(74) *Attorney, Agent, or Firm* — Greenblum & Bernstein, P.L.C.

(57) ABSTRACT

A dimming device includes a controller that performs control to apply any of a plurality of pattern voltages having predetermined voltage waveforms to each of a plurality of row electrodes and a plurality of column electrodes of a dimming panel including a dimming layer, according to a gradation of each of the plurality of dimming regions. The controller selects a pattern voltage to be applied to each of the plurality of row electrodes and the plurality of column electrodes according to a gradation of each of a plurality of dimming regions in the dimming layer defined by the plurality of row electrodes and the plurality of column electrodes, in each of a plurality of frame periods that are periods different from each other and constitute a repetition period indicating a period serving as a unit, in units of which repetition for controlling dimming is performed.

12 Claims, 13 Drawing Sheets

| GRADATION LEVEL | 0 | 1/4 | 2/4 | 3/4 | 1 |
|---|---|---|---|---|---|
| RELATIVE ON-PERIOD | 0 | 0.1 | 0.2 | 0.4 | 1 |

1

| GRADATION LEVEL | 0 | 1/4 | 2/4 | 3/4 | 1 |
|---|---|---|---|---|---|
| RELATIVE ON-PERIOD | 0 | 0.1 | 0.2 | 0.4 | 1 |

DIMMING DEVICE AND DISPLAY DEVICE

CROSS-REFERENCE TO RELATED APPLICATIONS

This application is based upon and claims the benefit of priority from Japanese Patent Application No. 2024-055222, filed on Mar. 29, 2024, the entire contents of which are incorporated herein by reference.

FIELD

The present disclosure relates to a dimming device and a display device.

BACKGROUND

In the related art, a dimming device capable of transmitting or attenuating external light from a back surface is known.

Related techniques are described in JP 2021-26222 A, and JP 2021-184062 A.

In such a dimming device, a plurality of methods for dimming in halftone using a frame rate control (FRC) system in a passive matrix are proposed.

However, a method for performing dimming in halftone by using a driving system that has a matrix-like dimming region and can set the driving voltage to zero is not proposed.

Therefore, the present disclosure provides a dimming device and a display device capable of performing dimming in halftone and improving dimming performances.

SUMMARY

A dimming device according to the present disclosure includes a dimming panel, and a controller. The dimming panel includes a plurality of row electrodes extending in a first direction, a plurality of column electrodes extending in a second direction intersecting the first direction, and a dimming layer disposed between the plurality of row electrodes and the plurality of column electrodes and having a plurality of dimming regions defined in a matrix form by the plurality of row electrodes and the plurality of column electrodes. The controller performs control to apply any of a plurality of pattern voltages having predetermined voltage waveforms to each of the plurality of row electrodes and the plurality of column electrodes according to a gradation of each of the plurality of dimming regions. The controller selects a pattern voltage to be applied to each of the plurality of row electrodes and the plurality of column electrodes according to a gradation of each of the plurality of dimming regions in each of a plurality of frame periods that are periods different from each other and constitute a repetition period indicating a period serving as a unit, in units of which repetition for controlling dimming is performed.

DETAILED DESCRIPTION

Hereinafter, a dimming device according to an embodiment is described with reference to the drawings.

(1) First Embodiment

Figure 1:
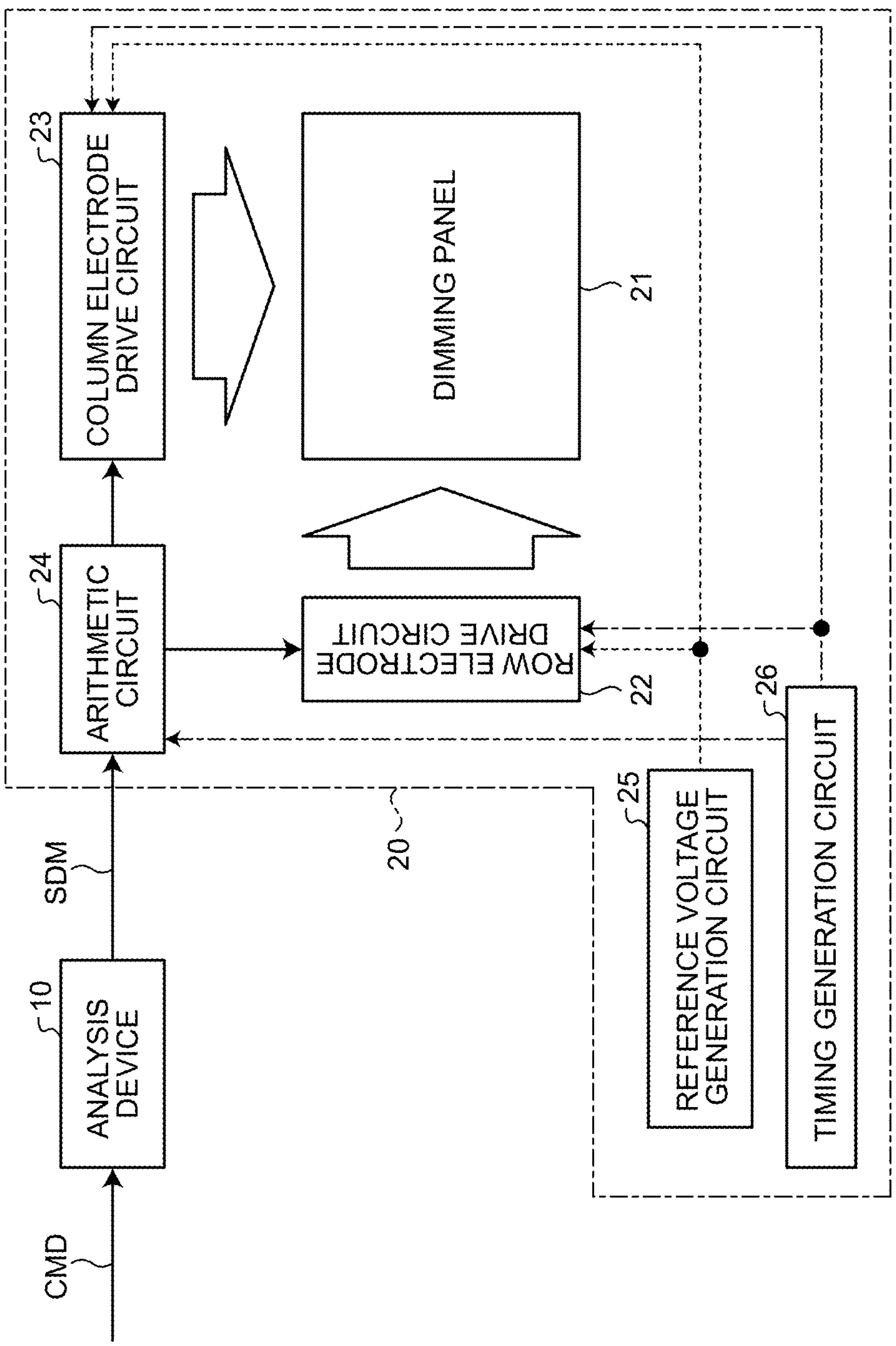
FIG. 1 is a schematic configuration block diagram of a dimming system including a dimming device of a first embodiment.

FIG. 1 is a schematic configuration block diagram of a dimming system including a dimming device of a first embodiment.

A dimming system 1 includes an analysis device 10 and a dimming device 20.

The analysis device 10 receives a request command CMD related to dimming from a host controller such as a personal computer. The request command CMD may be, for example, instruction data of gradation level distribution in a dimming panel for external light or image data corresponding to an image to be displayed when the dimming panel is used as a display device.

The analysis device 10 analyzes the received request command CMD, generates a dimming signal SDM according to the analysis result, and supplies the dimming signal SDM to the dimming device 20.

As illustrated in FIG. 1, the dimming device 20 includes a dimming panel 21, a row electrode drive circuit 22, a column electrode drive circuit 23, an arithmetic circuit 24, a reference voltage generation circuit 25, and a timing generation circuit 26.

Figure 2:
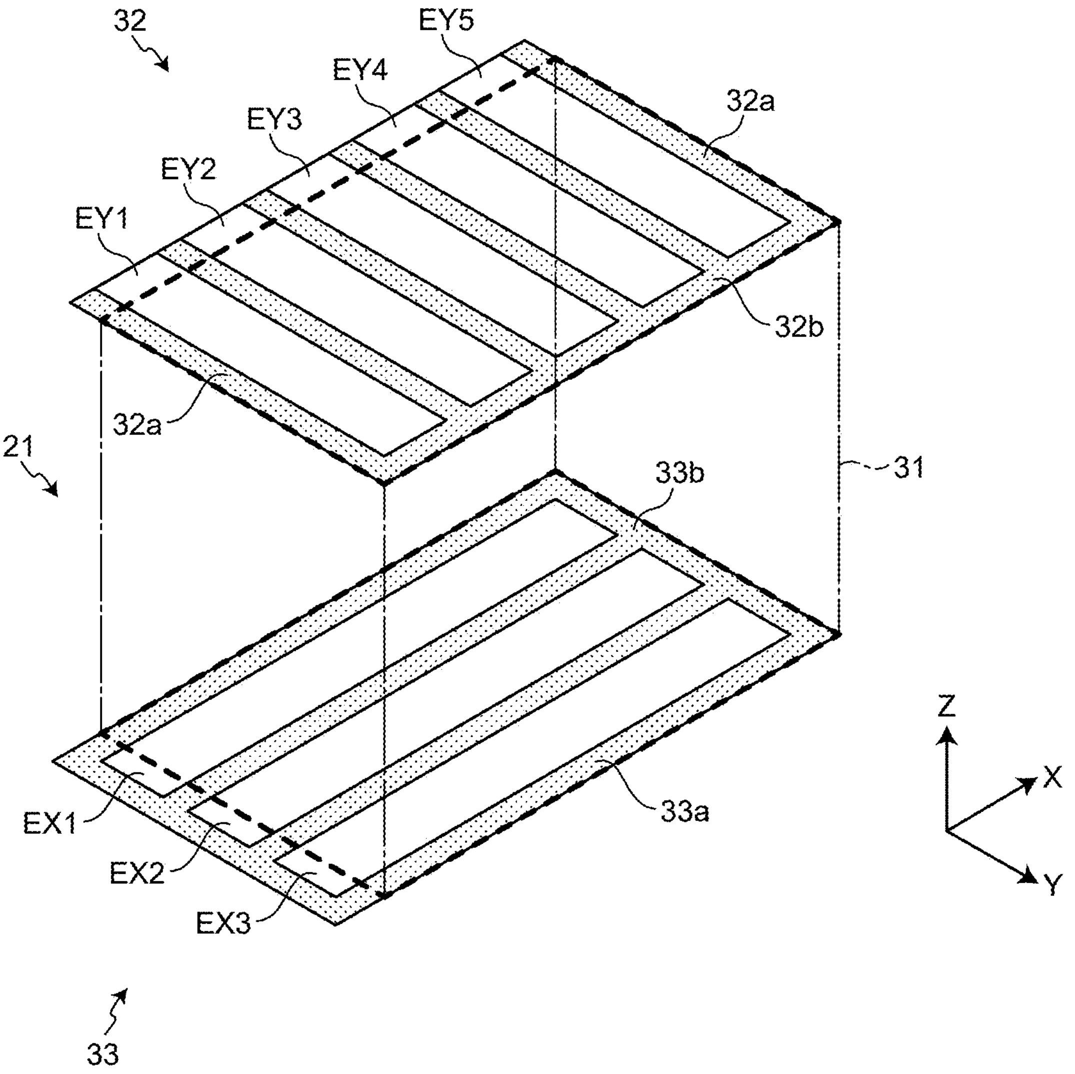
FIG. 2 is a perspective view illustrating a configuration of a part of the dimming panel.

FIG. 2 is a perspective view illustrating a configuration of a part of the dimming panel.

As illustrated in FIG. 2, the dimming panel 21 includes a dimming layer 31, a plurality of column electrodes EY1 to EY5, and a plurality of row electrodes EX1 to EX3.

The dimming layer 31 extends in a substantially plate shape in the XY direction. In the dimming layer 31, for example, a dimming control liquid crystal 31*b* is sealed in a plate-shaped member 31*a*.

In the case of the example of FIG. 2, the dimming layer 31 has a front surface on the +Z side and a back surface on the −Z side. A +Z-side surface of the box-shaped member 31*a* configures a front surface of the dimming layer 31, and a −Z-side surface of the member 31*a* configures a back surface of the dimming layer 31.

The plurality of column electrodes EY1 to EY5 are arranged on the front surface side (+Z side) of the dimming layer 31.

The plurality of column electrodes EY1 to EY5 is provided, for example, on a substrate 32 disposed on the front surface of the dimming layer 31. The substrate 32 may be bonded to the front surface of the dimming layer 31 via an adhesive or the like. The substrate 32 is formed in a plate shape extending in the XY direction.

Each of the column electrodes EY1 to EY5 is formed of, for example, a transparent conductive material such as ITO. Further, the substrate 32 is formed of, for example, a transparent insulating resin or the like.

Figure 3A:
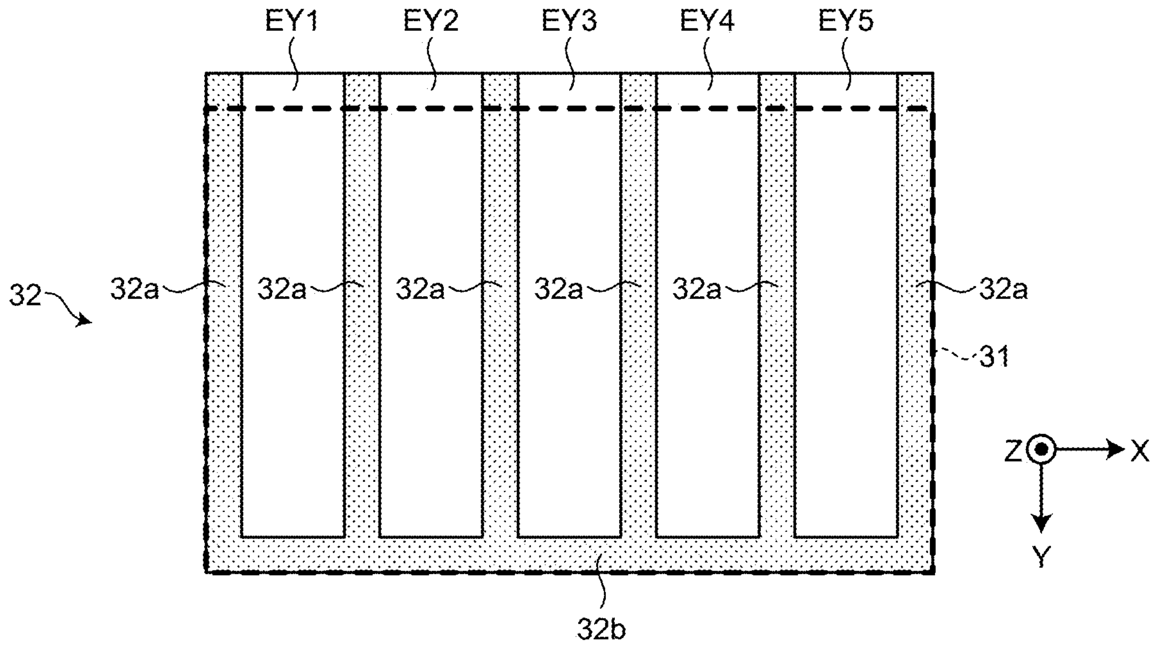
FIGS. 3A and 3B are plan views of a column electrode and a row electrode.
Figure 3B:
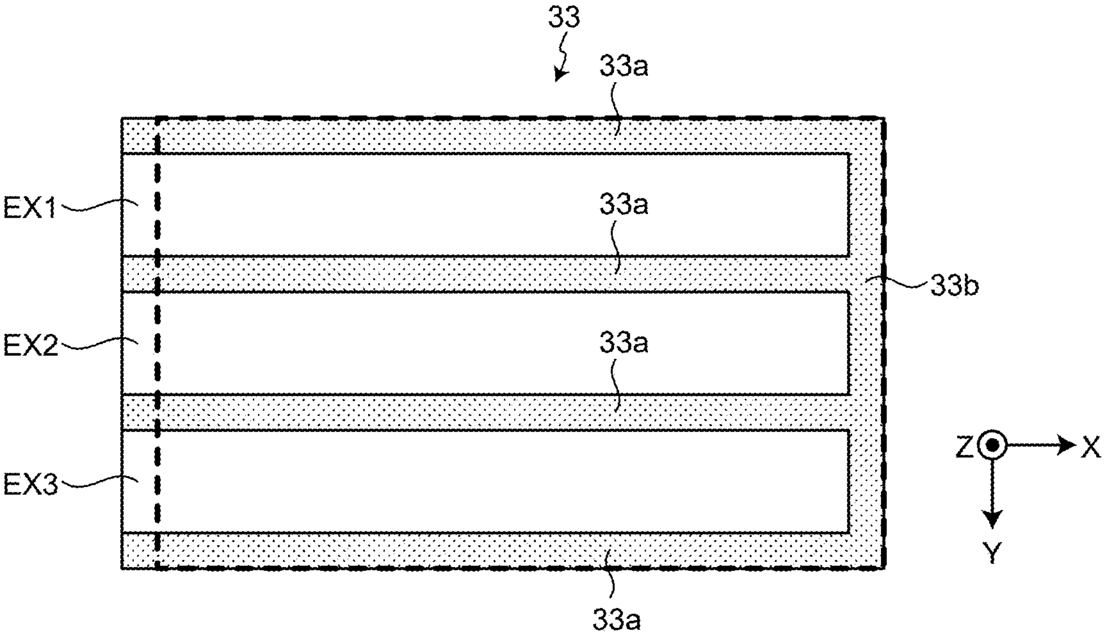

FIGS. 3A and 3B are plan views of a column electrode and a row electrode.

As illustrated in FIG. 3A, on the substrate 32, the plurality of column electrodes EY1 to EY5 are insulated from each other by an insulating portion 32*a* and an insulating portion 32*b* and are arranged in the X direction. As a result, the plurality of column electrodes EY1 to EY5 are arranged in the X direction along the front surface of the dimming layer 31. On the substrate 32, each of the column electrodes EY1 to EY5 extends in the Y direction. The insulating portion 32*a* extends in the Y direction between the plurality of column electrodes EY1 to EY5. The insulating portion 32*b* extends in the X direction and is connected to end portions of the plurality of insulating portions 32*a* on the +Y side.

The plurality of row electrodes EX1 to EX3 illustrated in FIG. 2 is arranged on the −Z side of the dimming layer 31. The plurality of row electrodes EX1 to EX3 may be disposed on a substrate 33 disposed on the back surface of the dimming layer 31. The plurality of row electrodes EX1 to EX3 face the plurality of column electrodes EY1 to EY5 with the dimming layer 31 interposed therebetween. The substrate 33 may be bonded to the front surface of the dimming layer 31 via an adhesive or the like. The substrate 33 extends in a plate shape in the XY direction. Each row electrode EX may be formed of a transparent conductive material such as ITO. The substrate 33 is formed of, for example, a transparent insulating resin or the like.

As illustrated in FIG. 3B, on the substrate 33, the plurality of row electrodes EX1 to EX3 are insulated from each other by an insulating portion 33*a* and an insulating portion 33*b* and are arranged in the Y direction. As a result, the plurality of row electrodes EX1 to EX3 are arranged in the Y direction along the front surface of the dimming layer 31. On the substrate 33, each of the row electrodes EX1 to EX3 extends in the X direction. The insulating portion 33*a* extends in the X direction between the plurality of row electrodes EX1 to EX3. The insulating portion 33*b* extends in the Y direction and is connected to end portions of the plurality of insulating portions 33*a* on the +X side.

Figures 4, 5:
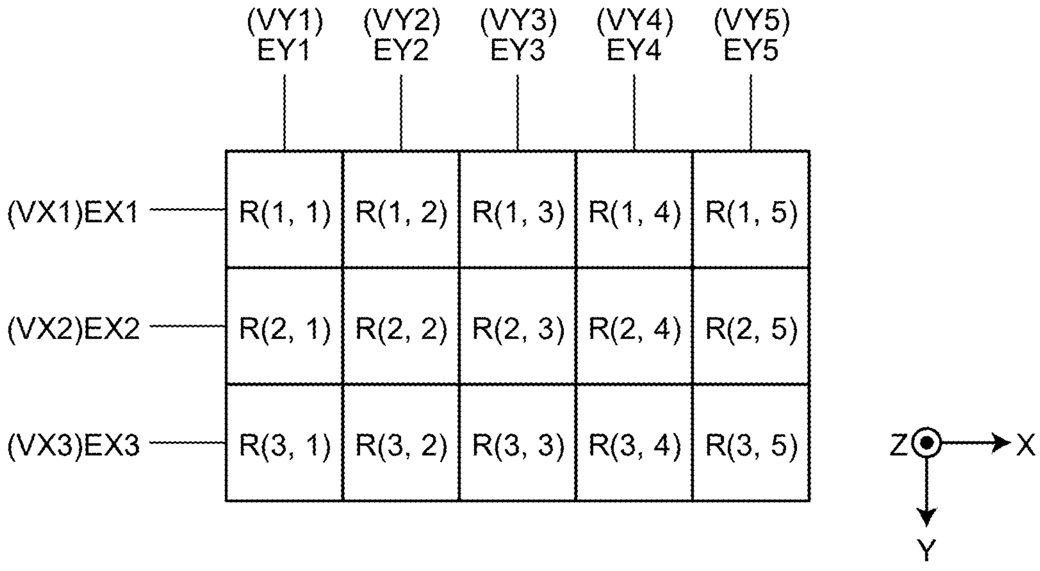
FIG. 4 is a plan view illustrating a plurality of dimming regions defined by the dimming panel.
FIG. 5 is an explanatory diagram illustrating a correspondence relationship between a gradation level and a relative on-period.

FIG. 4 is a plan view illustrating a plurality of dimming regions defined by the dimming panel 2.

In the dimming layer 31 illustrated in FIG. 2, a plurality of dimming regions R(1, 1) to R(5, 3) as illustrated in FIG. 4 are defined at a plurality of intersection positions of the plurality of column electrodes EY1 to EY5 and the plurality of row electrodes EX1 to EX3.

Hereinafter, the correspondence relationships of the column electrodes EY1 to EY5 and the row electrodes EX1 to EX3 with the respective dimming regions R(1, 1) to R(5, 3) are described with reference to examples.

The dimming region R(1, 1) is formed at a position where the row electrode EX1 and the column electrode EY1 intersect in the dimming layer 31 when viewed from the Z direction. In the dimming region R(1, 1), any pattern voltage VX1 among a plurality of pattern voltages having a predetermined voltage waveform is applied from the row electrode EX1 on the −Z side, and any pattern voltage VY1 among a plurality of pattern voltages having a predetermined voltage waveform is applied from the column electrode EY1 on the +Z side.

The dimming region R(1, 2) is formed at a position where the row electrode EX1 and the column electrode EY2 intersect in the dimming layer 31 when viewed from the Z direction. In the dimming region R(1, 2), any pattern voltage VX1 among a plurality of pattern voltages having a predetermined voltage waveform is applied from the row electrode EX1 on the −Z side, and any pattern voltage VY2 among a plurality of pattern voltages having a predetermined voltage waveform is applied from the column electrode EY2 on the +Z side.

The dimming region R(1, 3) is formed at a position where the row electrode EX1 and the column electrode EY3 intersect in the dimming layer 31 when viewed from the Z direction. In the dimming region R(1, 3), any pattern voltage VX1 among a plurality of pattern voltages having a predetermined voltage waveform is applied from the row electrode EX1 on the −Z side, and any pattern voltage VY3 among a plurality of pattern voltages having a predetermined voltage waveform is applied from the column electrode EY3 on the +Z side.

The dimming region R(1, 4) is formed at a position where the row electrode EX1 and the column electrode EY4 intersect in the dimming layer 31 when viewed from the Z direction. In the dimming region R(1, 4), any pattern voltage VX1 among a plurality of pattern voltages having a predetermined voltage waveform is applied from the row electrode EX1 on the −Z side, and any pattern voltage VY4 among a plurality of pattern voltages having a predetermined voltage waveform is applied from the column electrode EY4 on the +Z side.

The dimming region R(1, 5) is formed at a position where the row electrode EX1 and the column electrode EY5 intersect in the dimming layer 31 when viewed from the Z direction. In the dimming region R(1, 5), any pattern voltage VX1 among a plurality of pattern voltages having a predetermined voltage waveform is applied from the row electrode EX1 on the −Z side, and any pattern voltage VY5 among a plurality of pattern voltages having a predetermined voltage waveform is applied from the column electrode EY5 on the +Z side.

The dimming region R(2, 1) is formed at a position where the row electrode EX2 and the column electrode EY1 intersect in the dimming layer 31 when viewed from the Z direction. In the dimming region R(2, 1), any pattern voltage VX2 among a plurality of pattern voltages having a predetermined voltage waveform is applied from the row electrode EX2 on the −Z side, and any pattern voltage VY1 among a plurality of pattern voltages having a predetermined voltage waveform is applied from the column electrode EY1 on the +Z side.

The dimming region R(3, 1) is formed at a position where the row electrode EX3 and the column electrode EY1 intersect in the dimming layer 31 when viewed from the Z direction. In the dimming region R(3, 1), any pattern voltage VX3 among a plurality of pattern voltages having a predetermined voltage waveform is applied from the row electrode EX3 on the −Z side, and any pattern voltage VY1 among a plurality of pattern voltages having a predetermined voltage waveform is applied from the column electrode EY1 on the +Z side.

The dimming region R(3, 5) is formed at a position where the row electrode EX3 and the column electrode EY5 intersect in the dimming layer 31 when viewed from the Z direction. In the dimming region R(3, 5), any pattern voltage VX3 among a plurality of pattern voltages having a predetermined voltage waveform is applied from the row electrode EX3 on the −Z side, and any pattern voltage VY5 among a plurality of pattern voltages having a predetermined voltage waveform is applied from the column electrode EY5 on the +Z side.

The same applies to the other dimming regions R(2, 2) to R(2, 5) and the dimming regions R(3, 2) to R(3, 4).

The row electrode drive circuit 22 is electrically connected to the plurality of row electrodes EX1 to EX3. A row electrode drive circuit 22 drives each of the plurality of row electrodes EX1 to EX3 with a voltage waveform corresponding to a row control signal using the reference voltage in synchronization with the clock signal. The row electrode drive circuit 22 can individually drive the plurality of row electrodes EX1 to EX3. The row electrode drive circuit 22 selects any pattern voltage among a plurality of (three, in the present embodiment) pattern voltages (pattern voltages Va, Vb, and Vc, in the present embodiment) according to a row control signal.

Then, the row electrode drive circuit 22 supplies the selected pattern voltage to the row electrodes EX1 to EX3 in synchronization with a clock signal.

Similarly to the row electrode drive circuit 22, the column electrode drive circuit 23 is electrically connected to the plurality of column electrodes EY1 to EY5. The column electrode drive circuit 23 drives each of the plurality of column electrodes EY1 to EY4 with a voltage waveform corresponding to a column control signal using the reference voltage in synchronization with the clock signal. The column electrode drive circuit 23 can individually drive the plurality of column electrodes EY1 to EY4. The column electrode drive circuit 23 selects any reference voltage among the first reference voltage and the second reference voltage according to the column control signal. The column electrode drive circuit 23 can supply the selected reference voltage to the column electrodes EY1 to EY4 in synchronization with the clock signal.

The arithmetic circuit 24 is electrically connected between the analysis device 10, the row electrode drive circuit 22, and the column electrode drive circuit 23. The arithmetic circuit 24 receives an input of the dimming signal SDM from the analysis device 10. A plurality of pattern voltages are preset in the dimming device 20. The plurality of pattern voltages may be preset in the arithmetic circuit 24, the row electrode drive circuit 22, and the column electrode drive circuit 23, respectively. The dimming signal SDM includes an instruction to designate a pattern voltage to be supplied to the plurality of column electrodes EY1 to EY5 among the plurality of pattern voltages and an instruction to designate a pattern voltage to be supplied to the plurality of row electrodes EX1 to EX3.

In synchronization with the clock signal, the arithmetic circuit 24 generates a column control signal corresponding to the dimming signal SDM, supplies the column control signal to the column electrode drive circuit 23, generates a row control signal corresponding to the dimming signal SDM, and supplies the row control signal to the row electrode drive circuit 22. The column control signal includes an instruction of a pattern voltage to be supplied to each column electrode EY. The row control signal includes an instruction of a pattern voltage to be supplied to each row electrode EX.

The reference voltage generation circuit 25 is electrically connected to the row electrode drive circuit 22 and the column electrode drive circuit 23. The reference voltage generation circuit 25 generates a reference voltage. Then, the reference voltage generation circuit 25 supplies the reference voltage to the row electrode drive circuit 22 and the column electrode drive circuit 23.

The reference voltage generation circuit 25 may generate a first reference voltage (="H" level) and a second reference voltage (="L" level). The reference voltage generation circuit 25 may generate a reference voltage using a band gap voltage (for example, a forward voltage of a diode) according to a band gap energy of a semiconductor. The reference voltage generation circuit 25 may supply the first reference voltage and the second reference voltage to the row electrode drive circuit 22 and the column electrode drive circuit 23, respectively.

The timing generation circuit 26 is electrically connected to the row electrode drive circuit 22, the column electrode drive circuit 23, and the arithmetic circuit 24. The timing generation circuit 26 generates a clock signal. Then, the timing generation circuit 26 supplies the clock signal to each of the row electrode drive circuit 22, the column electrode drive circuit 23, and the arithmetic circuit 24.

Note that the timing generation circuit 26 can also be configured to generate a clock signal using a reference clock signal from an oscillator.

In the following description, it is assumed that the dimming device 20 can display five gradations, and in one dimming region, a state in which the external light is transmitted most is defined as a gradation level=1, and a state in which the external light is attenuated (or blocked) most is defined as a gradation level=0.

Further, the dimming device 20 sets a state in which approximately 75% of the external light with respect to the amount of transmitted light of the gradation level=1 is transmitted to the gradation level=¾, a state in which approximately 50% of the external light with respect to the amount of transmitted light of the gradation level=1 is transmitted to the gradation level=2/4, and a state in which approximately 25% of the external light with respect to the amount of transmitted light of the gradation level=1 is transmitted to the gradation level=¼.

Then, the dimming device 20 determines which any of the gradation level=0 to the gradation level=1 is to be applied for each of the dimming regions according to the dimming signal and performs control.

Next, an operation principle of the embodiment is described.

In the embodiment, frame rate control (FRC) is adopted, and in order to express a gradation level of intermediate gradation in each dimming region, a plurality of frames (four frames of frames 0 to 3, in the present embodiment) that are periods different from each other are used as a repetition period indicating a period serving as a unit, in units of which repetition for controlling dimming is performed.

FIG. 5 is an explanatory diagram illustrating a correspondence relationship between a gradation level and a relative on-period.

Here, the relative on-period refers to a ratio of a period in which each of the dimming regions is in the ON state in one repetition period in a case where the transmission state (corresponding to the gradation level=1) of the external light of each of the dimming regions is represented in the ON state and the blocking state (corresponding to the gradation level=0) of the external light is represented in the OFF state.

More specifically, as illustrated in FIG. 5, when the length of one repetition period is 1, in the case of the dimming region of the gradation level=0, the length of the period in the ON state is 0. That is, it indicates that there is no time in the ON state during one repetition period.

When the gradation level=1/4, the length of the period in the ON state is 0.1. That is, it indicates that the ratio of time in the ON state during one repetition period is 10% (=0.1/1×100).

When the gradation level=2/4, the length of the period in the ON state is 0.2. That is, it indicates that the ratio of time in the ON state during one repetition period is 20% (=0.2/1×100).

When the gradation level=3/4, the length of the period in the ON state is 0.4. That is, it indicates that the ratio of time in the ON state during one repetition period is 40% (=0.4/1×100).

Also, when the gradation level=1, the length of the period in the ON state is 1. That is, it indicates that the ratio of time in the ON state during one repetition period is 100% (=1/1×100).

In other words, in one repetition period, the gradation can be expressed by changing the length of the ON state of the dimming region.

Figure 6:
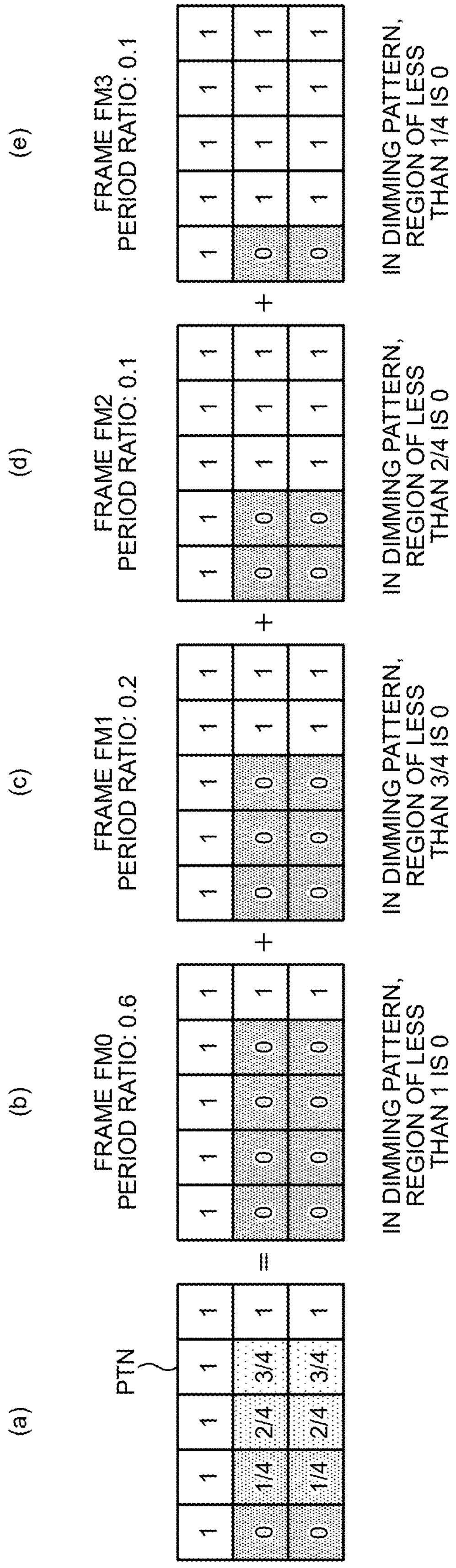
FIG. 6 is an explanatory diagram illustrating a relationship between the dimming pattern and the ON/OFF state of the dimming region in the frame.

FIG. 6 is an explanatory diagram illustrating a relationship between the dimming pattern and the ON/OFF state of the dimming region in the frame.

As illustrated in FIG. 4, a dimming pattern PTN is configured to correspond to 3×5 dimming regions.

Specifically, as illustrated at (a) in FIG. 6, in the dimming pattern PTN, the regions corresponding to the dimming region R(1, 1) to the dimming region R(1, 5), the dimming region R(2, 5), and the dimming region R(3, 5) illustrated in FIG. 4 are set to the gradation level=1.

Also, in the dimming pattern PTN, the regions corresponding to the dimming region R(2, 4) and the dimming region R(3, 4) illustrated in FIG. 4 are set to the gradation level=3/4.

Also, in the dimming pattern PTN, the regions corresponding to the dimming region R(2, 3) and the dimming region R(3, 3) illustrated in FIG. 4 are set to the gradation level=2/4.

Also, in the dimming pattern PTN, the regions corresponding to the dimming region R(2, 2) and the dimming region R(3, 2) illustrated in FIG. 4 are set to the gradation level=1/4.

Also, in the dimming pattern PTN, the regions corresponding to the dimming region R(2, 1) and the dimming region R(3, 1) illustrated in FIG. 4 are set to the gradation level=0.

In the case of the dimming pattern PTN illustrated at (a) in FIG. 6, in the frame period of the frame FM0, the dimming region in which the gradation level is 1 is set to the ON state, and the region in which the gradation level is less than 1 is set to the OFF state.

More specifically, as illustrated at (b) in FIG. 6, the regions corresponding to the dimming region R(1, 1) to the dimming region R(1, 5), the dimming region R(2, 5), and the dimming region R(3, 5) illustrated in FIG. 4 are set to the ON state, and the regions corresponding to the dimming region R(2, 1) to the dimming region R(2, 4), and the dimming region R(3, 1) to the dimming region R(3, 4) are set to the OFF state.

The period ratio of the frame period of the frame FM0 is set to 0.6.

In the case of the dimming pattern PTN illustrated at (a) in FIG. 6, in the frame period of the frame FM1, the dimming region in which the gradation level is 3/4 or more is set to the ON state, and the region in which the gradation level is less than 3/4 is set to the OFF state.

More specifically, as illustrated at (c) in FIG. 6, the regions corresponding to the dimming region R(1, 1) to the dimming region R(1, 5), the dimming region R(2, 4) to dimming region R(2, 5), and the dimming region R(3, 4) to the dimming region R(3, 5) illustrated in FIG. 4 are set to the ON state, and the regions corresponding to the dimming region R(2, 1) to the dimming region R(2, 3) and the dimming region R(3, 1) to the dimming region R(3, 3) are set to the OFF state.

The period ratio of the frame period of the frame FM1 is set to 0.2.

In the case of the dimming pattern PTN illustrated at (a) in FIG. 6, in the frame period of the frame FM2, the dimming region in which the gradation level is 2/4 or more is set to the ON state, and the dimming region in which the gradation level is less than 2/4 is set to the OFF state.

More specifically, as illustrated at (d) in FIG. 6, the regions corresponding to the dimming region R(1, 1) to the dimming region R(1, 5), the dimming region R(2, 3) to dimming region R(2, 5), and the dimming region R(3, 3) to the dimming region R(3, 5) illustrated in FIG. 4 are set to the ON state, and the regions corresponding to the dimming region R(2, 1) to the dimming region R(2, 2), and the dimming region R(3, 1) to the dimming region R(3, 2) are set to the OFF state.

The period ratio of the frame period of the frame FM2 is set to 0.1.

In the case of the dimming pattern PTN illustrated at (a) in FIG. 6, in the frame period of the frame FM3, the dimming region in which the gradation level is 1/4 or more is set to the ON state, and the dimming region in which the gradation level is less than 1/4, that is, gradation level=0 in the present embodiment, is set to the OFF state.

More specifically, as illustrated (e) in FIG. 6, the regions corresponding to the dimming region R(1, 1) to the dimming region R(1, 5), the dimming region R(2, 2) to dimming region R(2, 5), and the dimming region R(3, 2) to the dimming region R(3, 5) illustrated in FIG. 4 are set to the ON state, and the regions corresponding to the dimming region R(2, 1) and the dimming region R(3, 1) are set to the OFF state.

Also, the period ratio of the frame period of the frame FM3 is set to 0.1.

As a result, the relative on-periods in the regions corresponding to the dimming region R(1, 1) to the dimming region R(1, 5), the dimming region R(2, 5), and the dimming region R(3, 5) illustrated in FIG. 4 are 1 in total, which corresponds to the gradation level=1.

Also, in the dimming pattern PTN, the relative on-periods in the regions corresponding to the dimming region R(2, 4) and the dimming region R(3, 4) illustrated in FIG. 4 is 0.4 in total, which corresponds to the gradation level=3/4.

Also, in the dimming pattern PTN, the relative on-periods in the regions corresponding to the dimming region R(2, 3) and the dimming region R(3, 3) illustrated in FIG. 4 is 0.2 in total, which corresponds to the gradation level=2/4.

Also, in the dimming pattern PTN, the relative on-periods in the regions corresponding to the dimming region R(2, 2) and the dimming region R(3, 2) illustrated in FIG. 4 is 0.1 in total, which corresponds to the gradation level=1/4.

Also, in the dimming pattern PTN, the relative on-periods in the regions corresponding to the dimming region R(2, 1) and the dimming region R(3, 1) illustrated in FIG. 4 is 0 in total, which corresponds to the gradation level=0.

As described above, in each dimming region, the ON state (light-transmitting state) and the OFF state (light-shielding state) in the frame FM0 to the frame FM3 are controlled so that the relative on-period corresponds to the gradation level corresponding to the dimming pattern PTN in a certain repetition period (=a period corresponding to the continuous the frame FM0 to the frame FM), thereby performing halftone display.

Next, selection and application of a pattern voltage for realizing the dimming pattern PTN are described.

First, a pattern voltage according to the embodiment is described.

Figure 7:
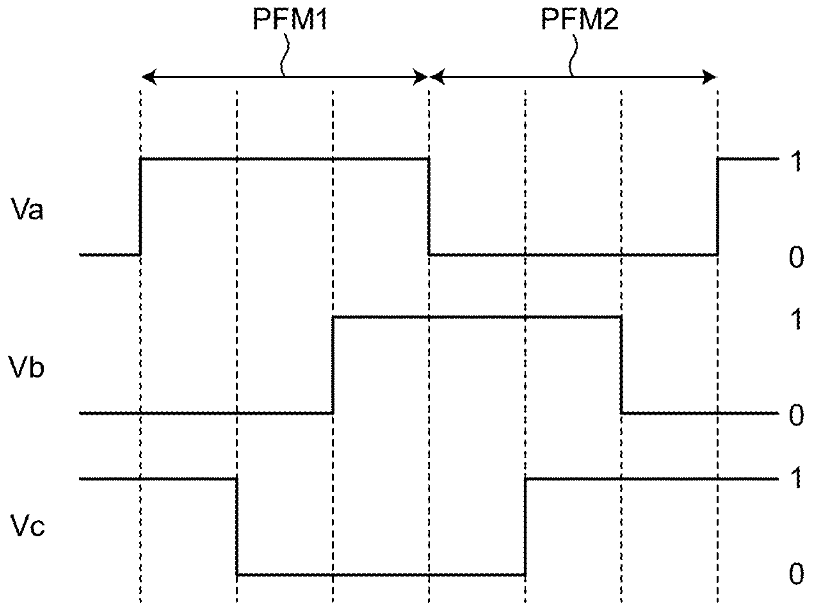
FIG. 7 is an explanatory diagram illustrating a pattern voltage.
Figure 8D:
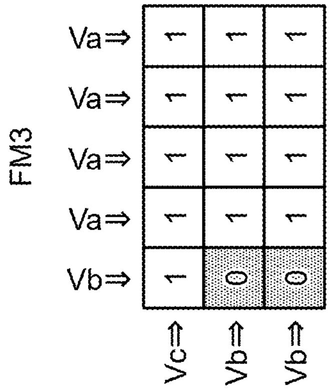
FIGS. 8A to 8D are timing charts (part 1) corresponding to the operation example of the first embodiment.
Figure 8C:
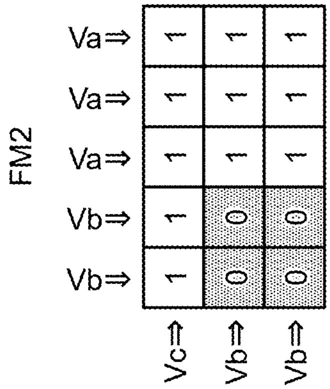
Figure 8B:
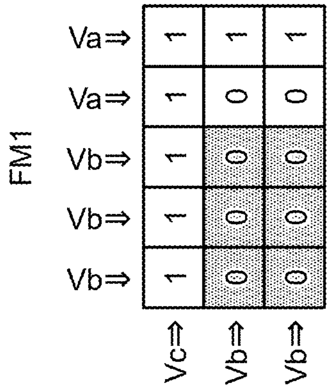
Figure 8A:
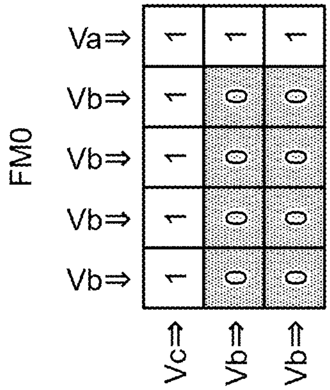

FIG. 7 is an explanatory diagram illustrating a pattern voltage.

In the present embodiment, there are three types of pattern voltages: the pattern voltage Va, the pattern voltage Vb, and the pattern voltage Vc.

Each of the pattern voltages Va to Vc has a division period obtained by equally dividing each frame period of the frame FM0 to the frame FM3 into three and maintains a signal level ("H" level or "L" level) at least during each division period.

In this case, the frame periods of the frame FM0 to the frame FM3 have different lengths, and the ratio of the frame periods is as follows in the present embodiment.

$$FM0:FM1:FM02:FM3 = 0.6:0.2:0.1:0.1$$

Here, each of the pattern voltages Va to Vc is a binary level signal and is a combination of any value of a high level of "1" and a low level of "0".

In the example of FIG. 7, in the first frame period PFM1, the signal levels of the pattern voltage Va are "1", "1", and "1" from a period side before three periods obtained by dividing a first frame period PFM1 into three equal parts (=three subframe periods of the frame period PFM1, the same is applied below), and the signal levels are "0", "0", and "0" from a period side before three periods obtained by dividing a second frame period PFM2 following the first frame period PFM1 into three equal parts (=three subframe periods of the frame period PFM2, the same is applied below).

In addition, signal levels of the pattern voltage Vb are "0", "0", and "1" from the period side before the three periods obtained by dividing the first frame period PFM1 into three equal parts, and signal levels are "1", "1", and "0" from the period side before the three periods obtained by dividing the second frame period PFM2 following the first frame period PFM1 into three equal parts.

In addition, signal levels of the pattern voltage Vc are "1", "0", and "0" from the period side before the three periods obtained by dividing the first frame period into three equal parts, and signal levels are "1", "1", and "0" from the period side before the three periods obtained by dividing the second frame period following the first frame period into three equal parts.

Also, the pattern voltages Va to Vc have the same effective value in a predetermined period (=two frame periods). That is, in the present embodiment, in any of the pattern voltages Va to Vc, in two frame periods, the signal level of "1" is for one frame period, and the signal level of "0" is for one frame period.

Next, the operation of the embodiment is described in detail.

In the following description, the operation is described so that the dimming pattern PTN illustrated at (a) in FIG. 6 is in the state of the frame FM0 to the frame FM3 illustrated at (b) to (e) in FIG. 6.

FIGS. 8A to 8D are timing charts (part 1) corresponding to the operation example of the first embodiment.

Period Corresponding Frame FM0

First, in the period corresponding to the frame FM0, the arithmetic circuit 24 applies the pattern voltage Vc to the row electrode EX1 and applies the pattern voltage Vb to the row electrode EX2 and the row electrode EX3.

Further, the arithmetic circuit 24 applies the pattern voltage Vb to the column electrodes EY1 to EY4 and applies the pattern voltage Va to the column electrode EY5.

Thus, to the dimming region R(1, 1) to the dimming region R(1, 4), the pattern voltage Vc is applied from the corresponding row electrode, and the pattern voltage Vb is applied from the corresponding column electrode. Therefore, the dimming region R(1, 1) to the dimming region R(1, 4) are set to the ON state during the ⅔ period of the frame period of the frame FM0 and set to the OFF state during the ⅓ period of the frame period of the frame FM0. Therefore, in the period corresponding to the frame FM0, the dimming region R(1, 1) to the dimming region R(1, 4) are effectively set to the ON state (light-transmitting state).

Also, to the dimming region R(1, 5), the pattern voltage Vc is applied from the corresponding row electrode, and the pattern voltage Va is applied from the corresponding column electrode. Therefore, the dimming region R(1, 5) is set to the ON state during the ⅔ period of the frame period of the frame FM0 and set to the OFF state during the ⅓ period of the frame period of the frame FM0. Therefore, in the period corresponding to the frame FM0, the dimming region R(1, 5) is effectively set to the ON state (light-transmitting state).

Also, to the dimming region R(2, 5) and the dimming region R(3, 5), the pattern voltage Vb is applied from the corresponding row electrode, and the pattern voltage Va is applied from the corresponding column electrode. Therefore, the dimming region R(2, 5) and the dimming region R(3, 5) are set to the ON state during the ⅔ period of the frame period of the frame FM0 and are set to the OFF state during the ⅓ period of the frame period of the frame FM0, and the dimming region R(2, 5) and the dimming region R(3, 5) are effectively set to the ON state (light-transmitting state).

Also, to the dimming region R(2, 5) and the dimming region R(3, 5), the pattern voltage Vb is applied from the corresponding row electrode, and the pattern voltage Va is applied from the corresponding column electrode. Therefore, the dimming region R(2, 5) and the dimming region R(3, 5) are set to the ON state during the ⅔ period of the frame period of the frame FM0 and set to the OFF state during the ⅓ period of the frame period of the frame FM0. Therefore, in the period corresponding to the frame FM0, the dimming region R(2, 5) and the dimming region R(3, 5) are effectively set to the ON state (light-transmitting state).

Also, to the dimming region R(2, 1) to the dimming region R(2, 4), and the dimming region R(3, 1) to the dimming region R(3, 4), the pattern voltage Vb is applied from the corresponding row electrode, and the pattern voltage Vb is applied from the corresponding column electrode. Therefore, the dimming region R(2, 1) to the dimming region R(2, 4), and the dimming region R(3, 1) to the dimming region R(3, 4) are set to the OFF state for the entire period of the frame period of the frame FM0. Therefore, in the period corresponding to the frame FM0, the dimming region R(2, 1) to the dimming region R(2, 4), and the dimming region R(3, 1) to the dimming region R(3, 4) are effectively set to the OFF state (light-shielding state).

First, for easier understanding, operations of the dimming region R(1, 1) to the dimming region R(1, 5) corresponding to the row electrode EX1 and the column electrodes EY1 to EY5 are described.

Period Corresponding Frame FM1

Next, in the period corresponding to the frame FM1, the arithmetic circuit 24 applies the pattern voltage Vc to the row electrode EX1 and applies the pattern voltage Vb to the row electrode EX2 and the row electrode EX3.

Further, the arithmetic circuit 24 applies the pattern voltage Vb to the column electrodes EY1 to EY3 and applies the pattern voltage Va to the column electrodes EY4 and EY5.

Thus, to the dimming region R(1, 1) to the dimming region R(1, 3), the pattern voltage Vc is applied from the corresponding row electrode, and the pattern voltage Vb is applied from the corresponding column electrode. Therefore, the dimming region R(1, 1) to the dimming region R(1, 3) are set to the ON state during the ⅔ period of the frame period of the frame FM1 and set to the OFF state during the ⅓ period of the frame period of the frame FM1. Therefore, in the period corresponding to the frame FM1, the dimming region R(1, 1) to the dimming region R(1, 3) are effectively set to the ON state (light-transmitting state).

Also, to the dimming region R(1, 4) and the dimming region R(1, 5), the pattern voltage Vc is applied from the corresponding row electrode, and the pattern voltage Va is applied from the corresponding column electrode. Therefore, the dimming region R(1, 4) and the dimming region R(1, 5) are set to the ON state during the ⅔ period of the frame period of the frame FM1 and set to the OFF state during the ⅓ period of the frame period of the frame FM1. Therefore, in the period corresponding to the frame FM1, the dimming region R(1, 4) and the dimming region R(1, 5) are effectively set to the ON state (light-transmitting state).

In addition, to the dimming region R(2, 4), the dimming region R(2, 5), the dimming region R(3, 4), and the dimming region R(3, 5), the pattern voltage Vb is applied from the corresponding row electrode, and the pattern voltage Va is applied from the corresponding column electrode, whereby the dimming region R(2, 4), the dimming region R(2, 5), the dimming region R(3, 4), and the dimming region R(3, 5) are set to the ON state during the ⅔ period of the frame period of the frame FM1 and are set to the OFF state during the ⅓ period of the frame period of the frame FM1. Therefore, in the period corresponding to the frame FM1, the dimming region R(2, 4), the dimming region R(2, 5), the dimming region R(3, 4), and the dimming region R(3, 5) are effectively set to the ON state (light-transmitting state).

Also, to the dimming region R(2, 1) to the dimming region R(2, 3), and the dimming region R(3, 1) to the dimming region R(3, 3), the pattern voltage Vb is applied from the corresponding row electrode, and the pattern voltage Vb is applied from the corresponding column electrode. Therefore, the dimming region R(2, 1) to the dimming region R(2, 3), and the dimming region R(3, 1) to the dimming region R(3, 3) are set to the OFF state for the entire period of the frame period of the frame FM1. Therefore, in the period corresponding to the frame FM1, the dimming region R(2, 1) to the dimming region R(2, 3), and the dimming region R(3, 1) to the dimming region R(3, 3) are effectively set to the OFF state (light-shielding state).

Period Corresponding Frame FM2

Next, in the period corresponding to the frame FM2, the arithmetic circuit 24 applies the pattern voltage Vc to the row electrode EX1 and applies the pattern voltage Vb to the row electrode EX2 and the row electrode EX3.

Further, the arithmetic circuit 24 applies the pattern voltage Vb to the column electrodes EY1 and EY2 and applies the pattern voltage Va to the column electrodes EY3 to EY5.

Thus, to the dimming region R(1, 1) and the dimming region R(1, 2), the pattern voltage Vc is applied from the corresponding row electrode, and the pattern voltage Vb is applied from the corresponding column electrode. Therefore, the dimming region R(1, 1) and the dimming region R(1, 2) are set to the ON state during the ⅔ period of the frame period of the frame FM2 and set to the OFF state during the ⅓ period of the frame period of the frame FM2. Therefore, in the period corresponding to the frame FM2, the dimming region R(1, 1) and the dimming region R(1, 2) are effectively set to the ON state (light-transmitting state).

Also, to the dimming region R(1, 3) to the dimming region R(1, 5), the pattern voltage Vc is applied from the corresponding row electrode, and the pattern voltage Va is applied from the corresponding column electrode. Therefore, the dimming region R(1, 3) to the dimming region R(1, 5) are set to the ON state during the ⅔ period of the frame period of the frame FM2 and set to the OFF state during the ⅓ period of the frame period of the frame FM2. Therefore, in the period corresponding to the frame FM2, the dimming region R(1, 3) to the dimming region R(1, 5) are effectively set to the ON state (light-transmitting state).

Also, to the dimming region R(2, 3) to the dimming region R(2, 5), and the dimming region R(3, 3) to the dimming region R(3, 5), the pattern voltage Vb is applied from the corresponding row electrode, and the pattern voltage Va is applied from the corresponding column electrode. Therefore, the dimming region R(2, 3) to the dimming region R(2, 5), and the dimming region R(3, 3) to the dimming region R(3, 5) are set to the ON state during the ⅔ period of the frame period of the frame FM2 and set to the OFF state during the ⅓ period of the frame period of the frame FM2. Therefore, in the period corresponding to the frame FM2, the dimming region R(2, 3) to the dimming region R(2, 5), and the dimming region R(3, 3) to the dimming region R(3, 5) are effectively set to the ON state (light-transmitting state).

Also, to the dimming region R(2, 1), the dimming region R(2, 2), the dimming region R(3, 1), and the dimming region R(3, 2), the pattern voltage Vb is applied from the corresponding row electrode, and the pattern voltage Vb is applied from the corresponding column electrode. Therefore, the dimming region R(2, 1), the dimming region R(2, 2), the dimming region R(3, 1), and the dimming region R(3, 2) are set to the OFF state for the entire period of the frame period of the frame FM2. Therefore, in the period corresponding to the frame FM2, the dimming region R(2, 1), the dimming region R(2, 2), the dimming region R(3, 1), and the dimming region R(3, 2) are effectively set to the OFF state (light-shielding state).

Period Corresponding Frame FM3

Next, in the period corresponding to the frame FM3, the arithmetic circuit 24 applies the pattern voltage Vc to the row electrode EX1 and applies the pattern voltage Vb to the row electrode EX2 and the row electrode EX3.

Further, the arithmetic circuit 24 applies the pattern voltage Vb to the column electrode EY1 and applies the pattern voltage Va to the column electrodes EY2 to EY5.

Thus, to the dimming region R(1, 1), the pattern voltage Vc is applied from the corresponding row electrode, and the pattern voltage Vb is applied from the corresponding column electrode. Therefore, the dimming region R(1, 1) is set to the ON state during the ⅔ period of the frame period of the frame FM3 and set to the OFF state during the ⅓ period of the frame period of the frame FM3. Therefore, in the period corresponding to the frame FM3, the dimming region R(1, 1) is effectively set to the ON state (light-transmitting state).

Also, to the dimming region R(1, 2) to the dimming region R(1, 5), the pattern voltage Vc is applied from the corresponding row electrode, and the pattern voltage Va is applied from the corresponding column electrode. Therefore, the ON state is set during the ⅔ period of the frame period of the frame FM3, and the OFF state is set during the ⅓ period of the frame period of the frame FM3. Therefore, in the period corresponding to the frame FM3, the dimming region R(1, 2) to the dimming region R(1, 5) are effectively set to the ON state (light-transmitting state).

Also, to the dimming region R(2, 2) to the dimming region R(2, 5), and the dimming region R(3, 2) to dimming region R(3, 5), the pattern voltage Vb is applied from the corresponding row electrode, and the pattern voltage Va is applied from the corresponding column electrode. Therefore, the ON state is set during the ⅔ period of the frame period of the frame FM3, and the OFF state is set during the ⅓ period of the frame period of the frame FM3. Therefore, in the period corresponding to the frame FM3, the dimming region R(2, 2) to the dimming region R(2, 5), and the dimming region R(3, 2) to dimming region R(3, 5) are effectively set to the ON state (light-transmitting state).

Also, to the dimming region R(2, 1) and the dimming region R(3, 1), the pattern voltage Vb is applied from the corresponding row electrode, and the pattern voltage Vb is applied from the corresponding column electrode. Therefore, the OFF state is set for the entire frame period of the frame FM3. Therefore, in the period corresponding to the frame FM3, the dimming region R(2, 1) and the dimming region R(3, 1) are effectively set to the OFF state (light-shielding state).

Then, at a time point when the processing of the continuous frames FM0 to FM3 described above is completed, if a period in which the dimming region R(1, 1) to the dimming region R(1, 5), the dimming region R(2, 5), and the dimming region R(3, 5) are set to the ON state (light-transmitting state), that is, a relative on-period of the dimming region R(1, 1) to the dimming region R(1, 5), the dimming region R(2, 5), and the dimming region R(3, 5) is set to "1", and a relative on-period is calculated for each dimming region, the relative on-period of the dimming region R(2, 1) and the dimming region R(3, 1) becomes "0". That is, the dimming region R(2, 1) and the dimming region R(3, 1) become regions of the gradation level=0.

Similarly, the relative on-period of the dimming region R(2, 2) and the dimming region R(3, 2) becomes "0.1". That is, the dimming region R(2, 2) and the dimming region R(3, 2) become regions of the gradation level=1/4.

Also, the relative on-period of the dimming region R(2, 3) and the dimming region R(3, 3) becomes "0.2". That is, the dimming region R(2, 3) and the dimming region R(3, 3) become regions of the gradation level=2/4.

Also, the relative on-period of the dimming region R(2, 4) and the dimming region R(3, 4) becomes "0.4". That is, the dimming region R(2, 4) and the dimming region R(3, 4) become regions of the gradation level=¾.

As described above, according to the present embodiment, the intermediate gradation display can be performed by controlling the length of the relative on-period in the repetition period.

Figure 9:
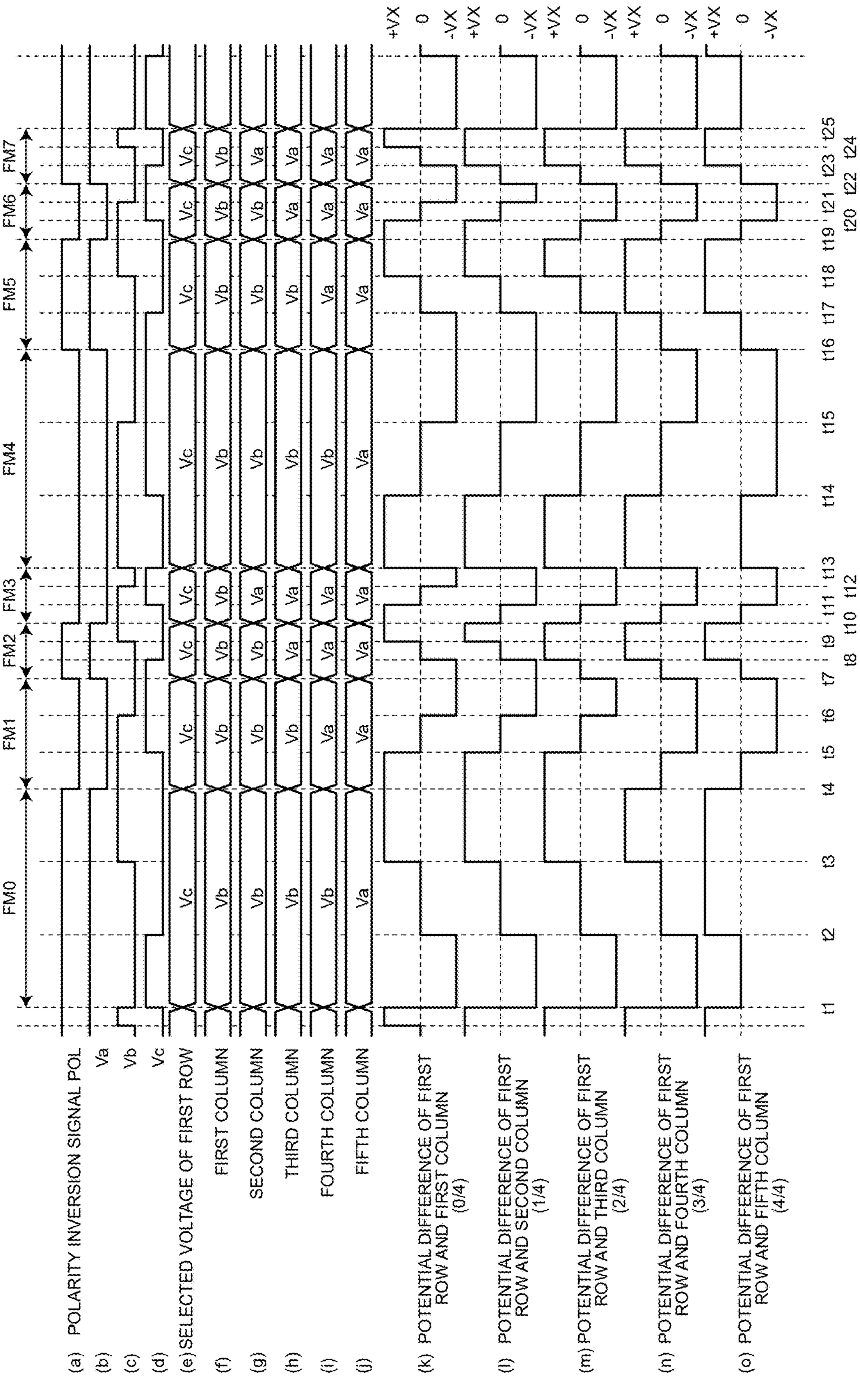
FIG. 9 is a timing chart (part 2) corresponding to the operation example of the first embodiment.

FIG. 9 is a timing chart (part 2) corresponding to the operation example of the first embodiment.

In FIG. 9, a polarity inversion signal POL of which a signal level is inverted for each frame as illustrated in Graph (a) is input from the arithmetic circuit 24 to the row electrode drive circuit 22 and the column electrode drive circuit 23.

The polarity inversion signal POL is a signal for inverting the polarities of the pattern voltages Va, Vb, and Vc. When a DC component is applied to the dimming device, it is likely that the contrast between the ON state (light-transmitting state) and the OFF state (light-shielding state) in each dimming region decreases. By inverting the polarities of the pattern voltages Va, Vb, and Vc, the DC component can be canceled.

Graphs (b) to (d) in FIG. 9 are the pattern voltages Va, Vb, and Vc illustrated in FIG. 7.

First, the operation of the dimming device 20 in the frame period corresponding to the frame FM0 is described.

As indicated by time t1, at the timing when the polarity inversion signal POL becomes the "H" level, the frame period corresponding to the frame FM0 starts, and the pattern voltages Va, Vb, and Vc are set to the non-inversion state.

In the frame period corresponding to the frame FM0 (=the period from the time t1 to the time t4), as the pattern voltage of the first row that is applied to the row electrode EX1, the pattern voltage Vc is selected as illustrated in Graph (e) of FIG. 9.

Similarly, in the frame period corresponding to the frame FM0 (=the period from the time t1 to the time t4), as the pattern voltage that is applied to the column electrode EY1 corresponding to the first column, the pattern voltage Vb is selected as illustrated in Graph (f) of FIG. 9.

Also, in the frame period corresponding to the frame FM0, as the pattern voltage that is applied to the column electrode EY2 corresponding to the second column, the pattern voltage Vb is selected as illustrated in Graph (g) of FIG. 9.

Also, in the frame period corresponding to the frame FM0, as the pattern voltage that is applied to the column electrode EY3 corresponding to the third column, the pattern voltage Vb is selected as illustrated in Graph (h) of FIG. 9.

Also, in the frame period corresponding to the frame FM0, as the pattern voltage that is applied to the column electrode EY4 corresponding to the fourth column, the pattern voltage Vb is selected as illustrated in Graph (i) of FIG. 9.

In contrast, in the frame period corresponding to the frame FM0, as the pattern voltage of the fifth column that is applied to the column electrode EY5 corresponding to the fifth column, the pattern voltage Va is selected as illustrated in Graph (j) of FIG. 9.

In the following description, it is assumed that the pattern voltages Va, Vb, and Vc have a high potential-side voltage of VX (volts: for example, +3 volts) and a low potential-side voltage of 0 (volts) in the non-inversion state. Also, in the inversion state, the pattern voltages Va, Vb, and Vc have a high potential-side voltage of 0 (volts) and a low potential-side voltage of −VX (volts: for example, −3 volts).

By applying the pattern voltage, as illustrated in Graph (k) of FIG. 9, a voltage corresponding to a potential difference between the pattern voltage Vc and the pattern voltage Vb is applied to the dimming region R(1, 1) corresponding to the first row and the first column via the row electrode EX1 and the column electrode EY1. That is, the voltage of −VX (volts) is applied in the period from the time t1 to the time t2, the voltage of 0 (volts) is applied in the period from the time t2 to the time t3, and the voltage of +VX (volts) is applied in the period from the time t3 to the time t4.

Also, as illustrated in Graph (l) of FIG. 9, a voltage corresponding to a potential difference between the pattern voltage Vc and the pattern voltage Vb is applied to the dimming region R(1, 2) corresponding to the first row and the second column via the row electrode EX1 and the column electrode EY2. That is, the voltage of −VX (volts) is applied in the period from the time t1 to the time t2, the voltage of 0 (volts) is applied in the period from the time t2 to the time t3, and the voltage of +VX (volts) is applied in the period from the time t3 to the time t4.

Also, as illustrated in Graph (m) of FIG. 9, a voltage corresponding to a potential difference between the pattern voltage Vc and the pattern voltage Vb is applied to the dimming region R(1, 3) corresponding to the first row and the third column via the row electrode EX1 and the column electrode EY3. That is, the voltage of −VX (volts) is applied in the period from the time t1 to the time t2, the voltage of 0 (volts) is applied in the period from the time t2 to the time t3, and the voltage of +VX (volts) is applied in the period from the time t3 to the time t4.

Also, as illustrated in Graph (n) of FIG. 9, a voltage corresponding to a potential difference between the pattern voltage Vc and the pattern voltage Vb is applied to the dimming region R(1, 4) corresponding to the first row and the fourth column via the row electrode EX1 and the column electrode EY4. That is, the voltage of −VX (volts) is applied in the period from the time t1 to the time t2, the voltage of 0 (volts) is applied in the period from the time t2 to the time t3, and the voltage of +VX (volts) is applied in the period from the time t3 to the time t4.

Also, as illustrated in Graph (o) of FIG. 9, a voltage corresponding to a potential difference between the pattern voltage Vc and the pattern voltage Va is applied to the dimming region R(1, 5) corresponding to the first row and the fifth column via the row electrode EX1 and the column electrode EY5. That is, the voltage of 0 (volts) is applied in the period from the time t1 to the time t2, the voltage of +VX (volts) is applied in the period from the time t2 to the time t3, and the voltage of +VX (volts) is applied in the period from the time t3 to the time t4.

Next, the operation in the frame period corresponding to the frame FM1 is described.

At the time t4, at the timing when the polarity inversion signal POL is inverted and becomes the "L" level, the frame period corresponding to the frame FM1 starts, and the pattern voltages Va, Vb, and Vc are set to the inversion state.

In the frame period corresponding to the frame FM1 (=the period from the time t4 to time t7), as the pattern voltage of the first row that is applied to the row electrode EX1, the pattern voltage Vc (inverted pattern voltage Vc) is selected as illustrated in Graph (e) of FIG. 9.

Similarly, in the frame period corresponding to the frame FM1, as the pattern voltage that is applied to the column electrode EY1 corresponding to the first column, the pattern voltage Vb (the inverted pattern voltage Vb) is selected as illustrated in Graph (f) of FIG. 9.

Also, in the frame period corresponding to the frame FM1, as the pattern voltage that is applied to the column electrode EY2 corresponding to the second column, the pattern voltage Vb (the inverted pattern voltage Vb) is selected as illustrated in Graph (g) of FIG. 9.

Also, in the frame period corresponding to the frame FM1, as the pattern voltage that is applied to the column electrode EY3 corresponding to the third column, the pattern voltage Vb (the inverted pattern voltage Vb) is selected as illustrated in Graph (h) of FIG. 9.

Also, in the frame period corresponding to the frame FM1, as the pattern voltage that is applied to the column electrode EY4 corresponding to the fourth column, the pattern voltage Va (the inverted pattern voltage Va) is selected as illustrated in Graph (i) of FIG. 9.

Also, in the frame period corresponding to the frame FM1, as the pattern voltage of the fifth column that is applied to the column electrode EY5 corresponding to the fifth column, the pattern voltage Va is selected as illustrated in Graph (j) of FIG. 9.

By applying the pattern voltage, as illustrated in Graph (k) of FIG. 9, a voltage corresponding to a potential difference between the pattern voltage Vc and the pattern voltage Vb is applied to the dimming region R(1, 1) corresponding to the first row and the first column via the row electrode EX1 and the column electrode EY1. That is, the voltage of +VX (volts) is applied in the period from the time t4 to time t5, the voltage of 0 (volts) is applied in the period from the time t5 to time t6, and the voltage of −VX (volts) is applied in the period from the time t6 to the time t7.

Also, as illustrated in Graph (l) of FIG. 9, a voltage corresponding to a potential difference between the pattern voltage Vc and the pattern voltage Vb is applied to the dimming region R(1, 2) corresponding to the first row and the second column via the row electrode EX1 and the column electrode EY2. That is, the voltage of −VX (volts) is applied in the period from the time t4 to the time t5, the voltage of 0 (volts) is applied in the period from the time t5 to the time t6, and the voltage of +VX (volts) is applied in the period from the time t6 to the time t7.

Also, as illustrated in Graph (m) of FIG. 9, a voltage corresponding to a potential difference between the pattern voltage Vc and the pattern voltage Vb is applied to the dimming region R(1, 3) corresponding to the first row and the third column via the row electrode EX1 and the column electrode EY3. That is, the voltage of −VX (volts) is applied in the period from the time t4 to the time t5, the voltage of 0 (volts) is applied in the period from the time t5 to the time t6, and the voltage of +VX (volts) is applied in the period from the time t6 to the time t7.

Also, as illustrated in Graph (n) of FIG. 9, a voltage corresponding to a potential difference between the pattern voltage Vc and the pattern voltage Va is applied to the dimming region R(1, 4) corresponding to the first row and the fourth column via the row electrode EX1 and the column electrode EY4. That is, the voltage of 0 (volts) is applied in the period from the time t4 to the time t5, the voltage of −VX (volts) is applied in the period from the time t5 to the time t6, and the voltage of −VX (volts) is applied in the period from the time t6 to the time t7.

Also, as illustrated in Graph (o) of FIG. 9, a voltage corresponding to a potential difference between the pattern voltage Vc and the pattern voltage Va is applied to the dimming region R(1, 5) corresponding to the first row and the fifth column via the row electrode EX1 and the column electrode EY5. That is, the voltage of 0 (volts) is applied in the period from the time t4 to the time t5, the voltage of −VX (volts) is applied in the period from the time t5 to the time t6, and the voltage of −VX (volts) is applied in the period from the time t6 to the time t7.

Next, the operation in the frame period corresponding to the frame FM2 is described.

At the time t7, at the timing when the polarity inversion signal POL is inverted and becomes the "H" level, the frame period corresponding to the frame FM2 starts, and the pattern voltages Va, Vb, and Vc are set to the non-inversion state.

In the frame period corresponding to the frame FM2 (=the period from the time t7 to time t10), as the pattern voltage of the first row that is applied to the row electrode EX1, the pattern voltage Vc (the inverted pattern voltage Vc) is selected as illustrated in Graph (e) of FIG. 9.

Similarly, in the frame period corresponding to the frame FM2, as the pattern voltage that is applied to the column electrode EY1 corresponding to the first column, the pattern voltage Vb is selected as illustrated in Graph (f) of FIG. 9.

Also, in the frame period corresponding to the frame FM2, as the pattern voltage that is applied to the column electrode EY2 corresponding to the second column, the pattern voltage Vb is selected as illustrated in Graph (g) of FIG. 9.

Also, in the frame period corresponding to the frame FM2, as the pattern voltage that is applied to the column electrode EY3 corresponding to the third column, the pattern voltage Va is selected as illustrated in Graph (h) of FIG. 9.

Also, in the frame period corresponding to the frame FM2, as the pattern voltage that is applied to the column electrode EY4 corresponding to the fourth column, the pattern voltage Va is selected as illustrated in Graph (i) of FIG. 9.

Also, in the frame period corresponding to the frame FM2, as the pattern voltage of the fifth column that is applied to the column electrode EY5 corresponding to the fifth column, the pattern voltage Va is selected as illustrated in Graph (j) of FIG. 9.

By applying the pattern voltage, as illustrated in Graph (k) of FIG. 9, a voltage corresponding to a potential difference between the pattern voltage Vc and the pattern voltage Vb is applied to the dimming region R(1, 1) corresponding to the first row and the first column via the row electrode EX1 and the column electrode EY1. That is, the voltage of −VX (volts) is applied in the period from the time t7 to time t8, the voltage of 0 (volts) is applied in the period from the time t8 to time t9, and the voltage of +VX (volts) is applied in the period from the time t9 to the time t10.

Also, as illustrated in Graph (l) of FIG. 9, a voltage corresponding to a potential difference between the pattern voltage Vc and the pattern voltage Vb is applied to the dimming region R(1, 2) corresponding to the first row and the second column via the row electrode EX1 and the column electrode EY2. That is, the voltage of −VX (volts) is applied in the period from the time t7 to the time t8, the voltage of 0 (volts) is applied in the period from the time t8 to the time t9, and the voltage of +VX (volts) is applied in the period from the time t9 to the time t10.

Also, as illustrated in Graph (m) of FIG. 9, a voltage corresponding to a potential difference between the pattern voltage Vc and the pattern voltage Va is applied to the dimming region R(1, 3) corresponding to the first row and the third column via the row electrode EX1 and the column electrode EY3. That is, a voltage of 0 (volts) is applied in the period from the time t7 to the time t8, and a voltage of +VX (volts) is applied in the period from the time t8 to the time t10.

Also, as illustrated in Graph (n) of FIG. 9, a voltage corresponding to a potential difference between the pattern voltage Vc and the pattern voltage Va is applied to the dimming region R(1, 4) corresponding to the first row and the fourth column via the row electrode EX1 and the column electrode EY4. That is, a voltage of 0 (volts) is applied in the period from the time t7 to the time t8, and a voltage of +VX (volts) is applied in the period from the time t8 to the time t10.

Also, as illustrated in Graph (o) of FIG. 9, a voltage corresponding to a potential difference between the pattern voltage Vc and the pattern voltage Va is applied to the dimming region R(1, 5) corresponding to the first row and the fifth column via the row electrode EX1 and the column electrode EY5. That is, a voltage of 0 (volts) is applied in the period from the time t7 to the time t8, and a voltage of +VX (volts) is applied in the period from the time t8 to the time t10.

Next, the operation in the frame period corresponding to the frame FM3 is described.

At the time t10, at the timing when the polarity inversion signal POL is inverted and becomes the "L" level, the frame period corresponding to the frame FM3 starts, and the pattern voltages Va, Vb, and Vc are set to the inversion state, again.

In the frame period corresponding to the frame FM3 (=the period from the time t10 to time t13), as the pattern voltage of the first row that is applied to the row electrode EX1, the pattern voltage Vc (the inverted pattern voltage Vc) is selected as illustrated in Graph (e) of FIG. 9.

Similarly, in the frame period corresponding to the frame FM3, as the pattern voltage that is applied to the column electrode EY1 corresponding to the first column, the pattern voltage Vb is selected as illustrated in Graph (f) of FIG. 9.

Also, in the frame period corresponding to the frame FM3, as the pattern voltage that is applied to the column electrode EY2 corresponding to the second column, the pattern voltage Va is selected as illustrated in Graph (g) of FIG. 9.

Also, in the frame period corresponding to the frame FM3, as the pattern voltage that is applied to the column electrode EY3 corresponding to the third column, the pattern voltage Va is selected as illustrated in Graph (h) of FIG. 9.

Also, in the frame period corresponding to the frame FM3, as the pattern voltage that is applied to the column electrode EY4 corresponding to the fourth column, the pattern voltage Va is selected as illustrated in Graph (i) of FIG. 9.

Also, in the frame period corresponding to the frame FM3, as the pattern voltage of the fifth column that is applied to the column electrode EY5 corresponding to the fifth column, the pattern voltage Va is selected as illustrated in Graph (j) of FIG. 9.

By applying the pattern voltage, as illustrated in Graph (k) of FIG. 9, a voltage corresponding to a potential difference between the pattern voltage Vc and the pattern voltage Vb is applied to the dimming region R(1, 1) corresponding to the first row and the first column via the row electrode EX1 and the column electrode EY1. That is, the voltage of +VX (volts) is applied in the period from the time t10 to time t11, the voltage of 0 (volts) is applied in the period from the time t11 to time t12, and the voltage of −VX (volts) is applied in the period from the time t12 to the time t13.

Also, as illustrated in Graph (l) of FIG. 9, a voltage corresponding to a potential difference between the pattern voltage Vc and the pattern voltage Vb is applied to the dimming region R(1, 2) corresponding to the first row and the second column via the row electrode EX1 and the column electrode EY2. That is, a voltage of 0 (volts) is applied in the period from the time t10 to the time t11, and a voltage of −VX (volts) is applied in the period from the time t11 to the time t13.

Also, as illustrated in Graph (m) of FIG. 9, a voltage corresponding to a potential difference between the pattern voltage Vc and the pattern voltage Va is applied to the dimming region R(1, 3) corresponding to the first row and the third column via the row electrode EX1 and the column electrode EY3. That is, a voltage of 0 (volts) is applied in the period from the time t10 to the time t11, and a voltage of −VX (volts) is applied in the period from the time t11 to the time t13.

Also, as illustrated in Graph (n) of FIG. 9, a voltage corresponding to a potential difference between the pattern voltage Vc and the pattern voltage Va is applied to the dimming region R(1, 4) corresponding to the first row and the fourth column via the row electrode EX1 and the column electrode EY4. That is, a voltage of 0 (volts) is applied in the period from the time t10 to the time t11, and a voltage of −VX (volts) is applied in the period from the time t11 to the time t13.

Also, as illustrated in Graph (o) of FIG. 9, a voltage corresponding to a potential difference between the pattern voltage Vc and the pattern voltage Va is applied to the dimming region R(1, 5) corresponding to the first row and the fifth column via the row electrode EX1 and the column electrode EY5. That is, a voltage of 0 (volts) is applied in the period from the time t10 to the time t11, and a voltage of −VX (volts) is applied in the period from the time t11 to the time t13.

As a result of the above operation, in all of the dimming region R(1, 1) to the dimming region R(1, 5), the gradation level=1.

Next, operations of the second and third rows of the first embodiment are described.

Figure 10:
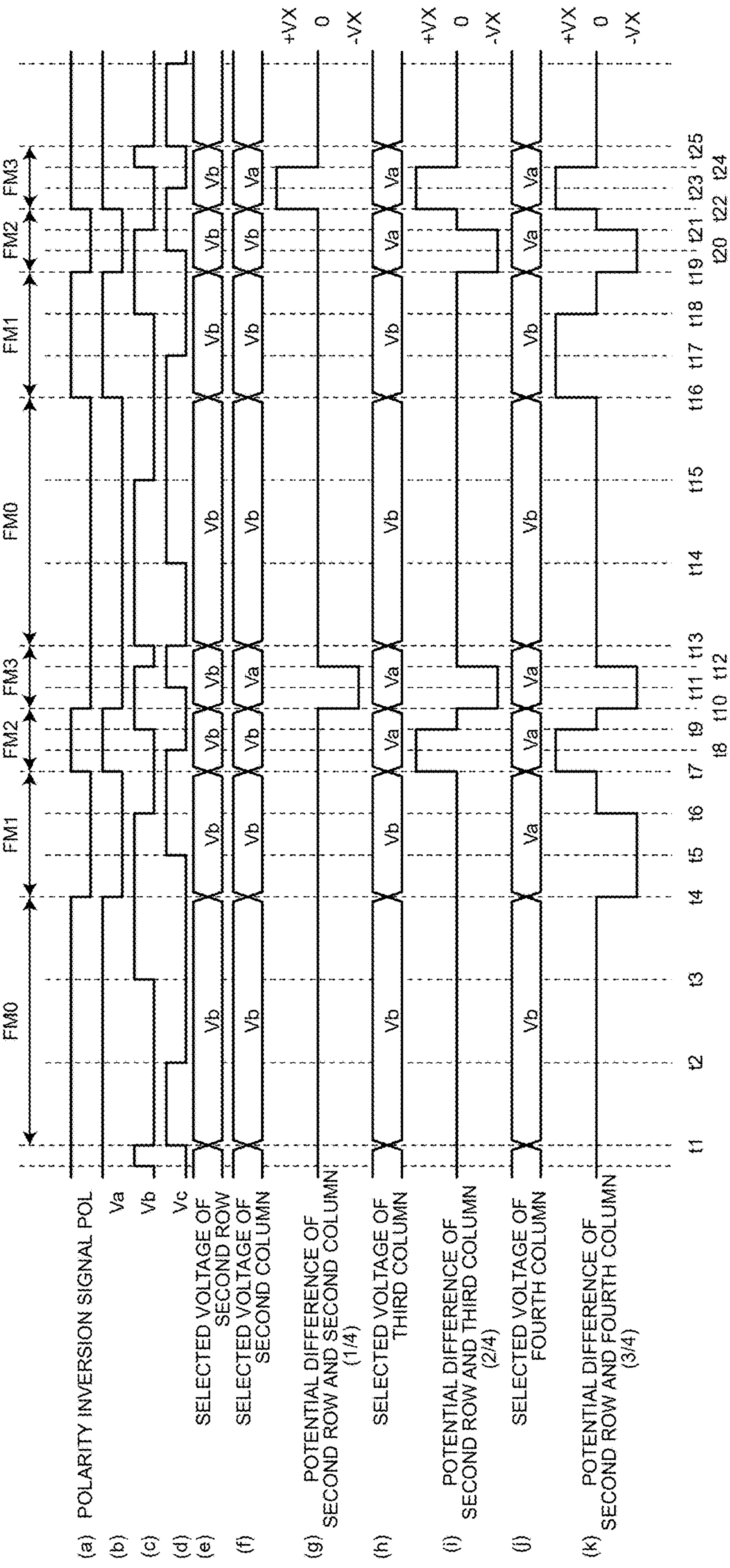
FIG. 10 is a timing chart corresponding to an operation example of a second column to a fourth column of a second row of the first embodiment.

In this case,

FIG. 10 is a timing chart corresponding to an operation example of the second column to the fourth column of the second row of the first embodiment.

Here, since the operations of the second row and the third row of the first embodiment are the same, only the operation of the second row is described.

Period Corresponding Frame FM0

First, in the period corresponding to the frame FM0 (the time t1 to the time t4), the arithmetic circuit 24 applies the pattern voltage Vb to the row electrode EX2.

Further, the arithmetic circuit 24 applies the pattern voltage Vb to the column electrodes EY1 to EY4.

Thus, to the dimming region R(2, 1) to the dimming region R(2, 4), the pattern voltage Vb is applied from the corresponding row electrode EX2, and the pattern voltage Vb is applied from the corresponding column electrodes EY1 to EY4. Therefore, in all the periods (the time t1 to the time t4) of the frame period of the frame FM0, the potential difference between the dimming region R(2, 1) to the dimming region R(2, 4) is 0 volts. Therefore, in the period corresponding to the frame FM0, the dimming region R(2, 1) to the dimming region R(2, 4) are effectively set to the OFF state (light-shielding state).

Meanwhile, though not illustrated, to the dimming region R(2, 5), the pattern voltage Vb is applied from the corresponding row electrode EX2, and the pattern voltage Va is applied from the corresponding column electrode EY5. Therefore, the dimming region R(2, 5) is set to the ON state during the ⅔ period of the frame period of the frame FM0 and set to the OFF state during the ⅓ period of the frame period of the frame FM0. Therefore, in the period corresponding to the frame FM0, the dimming region R(2, 5) is effectively set to the ON state (light-transmitting state).

(Period Corresponding Frame FM1)

First, in the period corresponding to the frame FM1 (the time t4 to the time t7), the arithmetic circuit 24 applies the pattern voltage Vb to the row electrode EX2.

Further, the arithmetic circuit 24 applies the pattern voltage Vb to the column electrodes EY1 to EY3 and applies the pattern voltage Va to the column electrodes EY4 and EY5.

Thus, to the dimming region R(2, 1) to the dimming region R(2, 3), the pattern voltage Vb is applied from the corresponding row electrode EX2, and the pattern voltage Vb is applied from the corresponding column electrodes EY1 to EY3. Thus, the potential difference becomes 0 volts in all the periods (the time t1 to the time t4) corresponding to the frame FM1. Therefore, in the period corresponding to the frame FM1, the dimming region R(2, 1) to the dimming region R(2, 3) are effectively set to the OFF state (light-shielding state).

Meanwhile, though not illustrated, to the dimming region R(2, 4) and the dimming region R(2, 5), the pattern voltage Vb is applied from the corresponding row electrode EX2, and the pattern voltage Va is applied from the corresponding column electrode EY4 and the corresponding column electrode EY5. Therefore, the dimming region R(2, 4) and the dimming region R(2, 5) are set to the ON state during the ⅔ period of the frame period of the frame FM0 and set to the OFF state during the ⅓ period of the frame period of the frame FM0. Therefore, in the period corresponding to the frame FM1, the dimming region R(2, 4) and the dimming region R(2, 5) are effectively set to the ON state (light-transmitting state).

Period Corresponding Frame FM2

First, in the period corresponding to the frame FM2 (the time t7 to the time t10), the arithmetic circuit 24 applies the pattern voltage Vb to the row electrode EX2.

Further, the arithmetic circuit 24 applies the pattern voltage Vb to the column electrodes EY1 to EY2 and applies the pattern voltage Va to the column electrodes EY3 to EY5.

Thus, to the dimming region R(2, 1) to the dimming region R(2, 2), the pattern voltage Vb is applied from the corresponding row electrode EX2, and the pattern voltage Vb is applied from the corresponding column electrodes EY1 to EY2. Therefore, in all the periods (the time t7 to the time t10) of the frame period of the frame FM2, the potential difference between the dimming region R(2, 1) to the dimming region R(2, 2) is 0 volts. Therefore, in the period corresponding to the frame FM2, the dimming region R(1, 1) to the dimming region R(1, 2) are effectively set to the OFF state (light-shielding state).

Meanwhile, though not illustrated, in the period corresponding to the frame FM2, to the dimming region R(2, 3) to the dimming region R(2, 5), the pattern voltage Vb is applied from the corresponding row electrode EX2, and the pattern voltage Va is applied from the corresponding column electrode EY3 to the corresponding column electrode EY5. Therefore, the ON state is set during the ⅔ period of the frame period of the frame FM2, and the OFF state is set during the ⅓ period of the frame period of the frame FM2. Therefore, in the period corresponding to the frame FM2, the dimming region R(2, 3) to the dimming region R(2, 5) are effectively set to the ON state (light-transmitting state).

Period Corresponding Frame FM3

Next, in the period corresponding to the frame FM3 (the time t10 to the time t13), the arithmetic circuit 24 applies the pattern voltage Vb to the row electrode EX2.

Further, the arithmetic circuit 24 applies the pattern voltage Vb to the column electrode EY1 and applies the pattern voltage Va to the column electrodes EY2 to EY5.

Thus, to the dimming region R(2, 1), the pattern voltage Vb is applied from the corresponding row electrode EX2, and the pattern voltage Vb is applied from the corresponding column electrodes EY1 to EY2. Therefore, in all the periods of the frame period of the frame FM3, the potential difference becomes 0 volts, and the dimming region R(2, 1) is effectively set to the OFF state (light-shielding state).

Meanwhile, to the dimming region R(2, 2) to the dimming region R(2, 5), the pattern voltage Vb is applied from the corresponding row electrode EX2, and the pattern voltage Va is applied from the corresponding column electrode EY2 to the corresponding column electrode EY5.

Therefore, the dimming region R(2, 2) to the dimming region R(2, 5) are set to the ON state during the ⅔ period of the frame period of the frame FM3 and set to the OFF state during the ⅓ period of the frame period of the frame FM3. Therefore, in the period corresponding to the frame FM3, the dimming region R(2, 3) to the dimming region R(2, 5) are effectively set to the ON state (light-transmitting state).

As a result of the above operation, the relative on-period of the dimming region R(2, 1) and the dimming region R(3, 1) becomes 0, and the gradation level=0.

Also, the relative on-period of the dimming region R(2, 2) and the dimming region R(3, 2) becomes 0.1, and the gradation level=¼.

Also, the relative on-period of the dimming region R(2, 3) and the dimming region R(3, 3) becomes 0.2, and the gradation level=²⁄₄.

Also, the relative on-period of the dimming region R(2, 4) and the dimming region R(3, 4) becomes 0.4, and the gradation level=¾.

Also, the relative on-period of the dimming region R(2, 5) and the dimming region R(3, 5) becomes 1, and the gradation level=1.

As described above, according to the first embodiment, the halftone can be displayed without complicating the control, and the power consumption can be suppressed in spite of the active matrix control, whereby the dimming performance can be improved.

(2) Second Embodiment

In the first embodiment, the dimming device performs dimming processing for the frame FM0 to the frame FM3 in units of frames. However, in a second embodiment, the dimming processing is performed for each of a plurality of (three in the second embodiment) subframes SF0 to SF2 that constitute each of the frame FM0 to the frame FM3.

That is, in the second embodiment, the dimming device performs the dimming processing on the four subframes SF0 included in the frames FM0 to FM3 and then performs the dimming processing on the four subframes SF1 included in the frame FM0 to the frame FM3.

Further, the dimming device performs the dimming processing on the four subframes SF2 included in the frame FM0 to the frame FM3 and then performs the dimming processing on four subframes SF3 included in the frame FM0 to the frame FM3.

When the dimming processing for the subframes SF3 is completed, the dimming device repeats the dimming processing from the subframe SF0 again.

Figure 11:
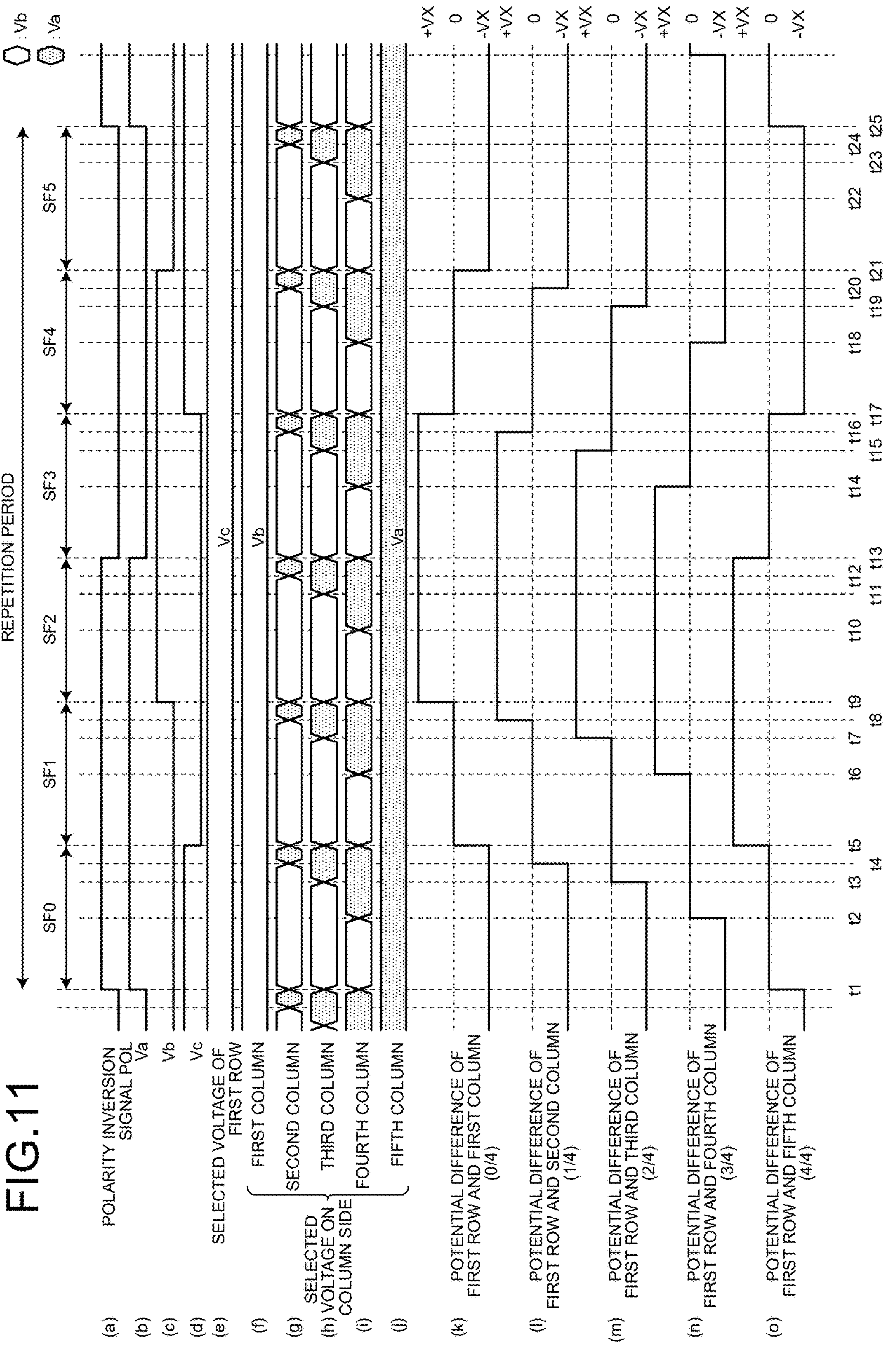
FIG. 11 is an operation timing chart (part 1) of a second embodiment.

FIG. 11 is an operation timing chart (part 1) of the second embodiment.

First, regarding the operation of the second embodiment, the operation of the first column corresponding to the column electrode EX1 is described.

Period Corresponding to Subframe SF0

In the period corresponding to the frame FM0 corresponding to the subframe SF0 (the time t1 to the time t5), the arithmetic circuit 24 applies the pattern voltage Vc to the row electrode EX1.

In addition, the arithmetic circuit 24 applies the pattern voltage Vb to the column electrode EY1 in a period corresponding to the subframe SF0.

Thus, to the dimming region R(1, 1), the pattern voltage Vc is applied from the corresponding row electrode EX1, and the pattern voltage Vb is applied from the corresponding column electrode EY1. Therefore, the potential difference becomes −VX volts in all the periods of the subframe SF0. Therefore, in the period corresponding to the subframe SF0, the dimming region R(1, 1) is effectively set to the ON state (light-transmitting state).

In addition, the arithmetic circuit 24 applies the pattern voltage Vb to the column electrode EY2 in a period from the time t1 to the time t4 among the period corresponding to the subframe SF0 and applies the pattern voltage Va to the column electrode EY2 in a period from the time t4 to the time t5.

Accordingly, to the dimming region R(1, 2), the pattern voltage Vc is applied in the period corresponding to the subframe SF0 from the corresponding row electrode EX1, the pattern voltage Vb is applied from the corresponding column electrode EY1 in the period from the time t1 to the time t4, and the pattern voltage Va is applied in the period from the time t4 to the time t5. Therefore, in the period of the subframe SF0, the potential difference in the period from the time t1 to the time t4 is −VX volts, and the potential difference in the period from the time t4 to the time t5 is 0 volts. Therefore, in the period corresponding to the subframe SF0, the dimming region R(1, 2) is effectively set to the state of 0.9.

In addition, the arithmetic circuit 24 applies the pattern voltage Vb to the column electrode EY3 in a period from the time t1 to the time t3 among the period corresponding to the subframe SF0 and applies the pattern voltage Va to the column electrode EY3 in a period from the time t3 to the time t5.

Accordingly, to the dimming region R(1, 3), the pattern voltage Vc is applied in the period corresponding to the subframe SF0 from the corresponding row electrode EX1, the pattern voltage Vb is applied from the corresponding column electrode EY1 in the period from the time t1 to the time t3, and the pattern voltage Va is applied in the period from the time t3 to the time t5. Therefore, in the period of the subframe SF0, the potential difference in the period from the time t1 to the time t3 is −VX volts, and the potential difference in the period from the time t3 to the time t5 is 0 volts. Therefore, in the period corresponding to the subframe SF0, the dimming region R(1, 3) is effectively set to the state of 0.8.

In addition, the arithmetic circuit 24 applies the pattern voltage Vb to the column electrode EY4 in a period from the time t1 to the time t2 among the period corresponding to the subframe SF0 and applies the pattern voltage Va to the column electrode EY4 in a period from the time t2 to the time t5.

Accordingly, in the dimming region R(1, 4), the pattern voltage Vc is applied in the period (the time t1 to the time t5) corresponding to the subframe SF0 from the corresponding row electrode EX1, the pattern voltage Vb is applied from the corresponding column electrode EY1 in the period from the time t1 to the time t2, and the pattern voltage Va is applied in the period from the time t2 to the time t5. Therefore, in the period (the time t1 to the time t5) of the subframe SF0, the potential difference in the period from the time t1 to the time t2 is −VX volts, and the potential difference in the period from the time t3 to the time t5 is 0 volts. Therefore, in the period corresponding to the subframe SF0, the relative on-period of the dimming region R(1, 4) is effectively set to the state of 0.6.

In addition, the arithmetic circuit 24 applies the pattern voltage Va to the column electrode EY5 in a period corresponding to the subframe SF0.

Thus, to the dimming region R(1, 5), the pattern voltage Vc is applied from the corresponding row electrode EX1, and the pattern voltage Va is applied from the corresponding column electrode EY5. Therefore, the potential difference becomes 0 volts in all the periods of the subframe SF0. Therefore, in the period corresponding to the subframe SF0, the dimming region R(1, 5) is effectively set to the OFF state (light-shielding state).

Period Corresponding to Subframe SF1

In the period corresponding to the subframe SF1 (the time t5 to the time t9), the arithmetic circuit 24 applies the pattern voltage Vc to the row electrode EX1.

In addition, the arithmetic circuit 24 applies the pattern voltage Vb to the column electrode EY1 in a period corresponding to the subframe SF1.

Thus, to the dimming region R(1, 1), the pattern voltage Vc is applied from the corresponding row electrode EX1, and the pattern voltage Vb is applied from the corresponding column electrode EY1. Therefore, the potential difference becomes 0 volts in all the periods of the subframe SF1. Therefore, in the period corresponding to the subframe SF1, the dimming region R(1, 1) is effectively set to the OFF state (light-shielding state).

In addition, the arithmetic circuit 24 applies the pattern voltage Vb to the column electrode EY2 in a period from the time t5 to the time t8 among the period corresponding to the subframe SF1 and applies the pattern voltage Va to the column electrode EY2 in a period from the time t8 to the time t9.

Accordingly, to the dimming region R(1, 2), the pattern voltage Vc is applied in the period corresponding to the subframe SF1 from the corresponding row electrode EX1, the pattern voltage Vb is applied from the corresponding column electrode EY1 in the period from the time t5 to the time t8, and the pattern voltage Va is applied in the period from the time t8 to the time t9. Therefore, in the period of the subframe SF1, the potential difference in the period from the time t5 to the time t8 is 0 volts, and the potential difference in the period from the time t8 to the time t9 is +VX volts. Therefore, in the period corresponding to the subframe SF1, the relative on-period of the dimming region R(1, 2) is effectively set to the state of 0.1.

In addition, the arithmetic circuit 24 applies the pattern voltage Vb to the column electrode EY3 in a period from the time t5 to the time t7 among the period corresponding to the subframe SF1 and applies the pattern voltage Va to the column electrode EY3 in a period from the time t7 to the time t9.

Accordingly, to the dimming region R(1, 3), the pattern voltage Vc is applied in the period corresponding to the subframe SF1 from the corresponding row electrode EX1, the pattern voltage Vb is applied from the corresponding column electrode EY1 in the period from the time t5 to the time t7, and the pattern voltage Va is applied in the period from the time t7 to the time t9. Therefore, in the period of the subframe SF1, the potential difference in the period from the time t5 to the time t7 is 0 volts, and the potential difference in the period from the time t7 to the time t9 is +VX volts. Therefore, in the period corresponding to the subframe SF1, the relative on-period of the dimming region R(1, 3) is effectively set to the state of 0.2.

In addition, the arithmetic circuit 24 applies the pattern voltage Vb to the column electrode EY4 in a period from the time t5 to the time to among the period corresponding to the subframe SF1 and applies the pattern voltage Va to the column electrode EY4 in a period from the time t6 to the time t9.

Accordingly, to the dimming region R(1, 4), the pattern voltage Vc is applied in the period corresponding to the subframe SF1 from the corresponding row electrode EX1, the pattern voltage Vb is applied from the corresponding column electrode EY1 in the period from the time t5 to the time t6, and the pattern voltage Va is applied in the period from the time to the time t9. Therefore, in the period of the subframe SF1, the potential difference in the period from the time t5 to the time t6 is 0 volts, and the potential difference in the period from the time t3 to the time t5 is +VX volts. Therefore, in the period corresponding to the subframe SF1, the relative on-period of the dimming region R(1, 4) is effectively set to the state of 0.4.

In addition, the arithmetic circuit 24 applies the pattern voltage Va to the column electrode EY5 in a period corresponding to the subframe SF1.

Thus, to the dimming region R(1, 5), the pattern voltage Vc is applied from the corresponding row electrode EX1, and the pattern voltage Va is applied from the corresponding column electrode EY5. Therefore, the potential difference becomes +VX volts in all the periods of the subframe SF1. Therefore, in the period corresponding to the subframe SF1, the dimming region R(1, 5) is effectively set to the ON state (light-transmitting state).

Period Corresponding to Subframe SF2

In the period corresponding to the subframe SF2 (the time t9 to the time t13), the arithmetic circuit 24 applies the pattern voltage Vc to the row electrode EX1.

In addition, the arithmetic circuit 24 applies the pattern voltage Vb to the column electrode EY1 in a period corresponding to the subframe SF2.

Thus, to the dimming region R(1, 1), the pattern voltage Vc is applied from the corresponding row electrode EX1, and the pattern voltage Vb is applied from the corresponding column electrode EY1. Therefore, the potential difference becomes +VX volts in all the periods of the subframe SF2. Therefore, in the period corresponding to the subframe SF2, the dimming region R(1, 1) is effectively set to the ON state (light-transmitting state).

In addition, the arithmetic circuit 24 applies the pattern voltage Vb to the column electrode EY2 in a period from the time t9 to the time t12 among the period corresponding to the subframe SF2 and applies the pattern voltage Va to the column electrode EY2 in a period from the time t12 to the time t13.

Accordingly, to the dimming region R(1, 2), the pattern voltage Vc is applied in the period corresponding to the subframe SF2 from the corresponding row electrode EX1, the pattern voltage Vb is applied from the corresponding column electrode EY1 in the period from the time t9 to the time t12, and the pattern voltage Va is applied in the period from the time t12 to the time t13. Therefore, in the period of the subframe SF2, the potential difference in the period from the time t9 to the time t12 is +VX volts, and the potential difference in the period from the time t12 to the time t13 is +VX volts. Therefore, in the period corresponding to the subframe SF2, the dimming region R(1, 2) is effectively set to the ON state (light-transmitting state).

In addition, the arithmetic circuit 24 applies the pattern voltage Vb to the column electrode EY3 in a period from the time t9 to the time t11 among the period corresponding to the subframe SF2 and applies the pattern voltage Va to the column electrode EY3 in a period from the time t11 to the time t13.

Accordingly, to the dimming region R(1, 3), the pattern voltage Vc is applied in the period corresponding to the subframe SF2 from the corresponding row electrode EX1, the pattern voltage Vb is applied from the corresponding column electrode EY1 in the period from the time t9 to the time t11, and the pattern voltage Va is applied in the period from the time t11 to the time t13. Therefore, in the period of the subframe SF2, the potential difference in the period from the time t9 to the time t11 is +VX volts, and the potential difference in the period from the time t11 to the time t13 is +VX volts. Therefore, in the period corresponding to the subframe SF2, the dimming region R(1, 3) is effectively set to the ON state (light-transmitting state).

In addition, the arithmetic circuit 24 applies the pattern voltage Vb to the column electrode EY4 in a period from the time t9 to the time t10 among the period corresponding to the subframe SF2 (the time t9 to the time t13) and applies the pattern voltage Va to the column electrode EY4 in a period from the time t10 to the time t13.

Accordingly, to the dimming region R(1, 4), the pattern voltage Vc is applied in the period corresponding to the subframe SF2 from the corresponding row electrode EX1, the pattern voltage Vb is applied from the corresponding column electrode EY1 in the period from the time t9 to the time t10, and the pattern voltage Va is applied in the period from the time t10 to the time t13. Therefore, in the period of the subframe SF2, the potential difference in the period from the time t9 to the time t10 is +VX volts, and the potential difference in the period from the time t10 to the time t13 is +VX volts. Therefore, in the period corresponding to the subframe SF2, the dimming region R(1, 4) is effectively set to the ON state (light-transmitting state).

In addition, the arithmetic circuit 24 applies the pattern voltage Va to the column electrode EY5 in a period corresponding to the subframe SF2.

Thus, to the dimming region R(1, 5), the pattern voltage Vc is applied from the corresponding row electrode EX1, and the pattern voltage Va is applied from the corresponding column electrode EY5. Therefore, the potential difference becomes +VX volts in all the periods of the subframe SF2. Therefore, in the period corresponding to the subframe SF2, the dimming region R(1, 5) is effectively set to the ON state (light-transmitting state).

Period Corresponding to Subframe SF3

In addition, the period corresponding to the subframe SF3 (the time t13 to the time t17), the period corresponding to a subframe SF4 (the time t17 to the time t21), and the period corresponding to a subframe SF5 (the time t21 to t25) are waveforms in which the signs of the pattern voltages Va, Vb, and Vc and the sign of the potential difference in the periods corresponding to the subframe SF0, the subframe SF1, and the subframe SF2 are inverted, respectively, and thus detailed description thereof is omitted.

Figure 12:
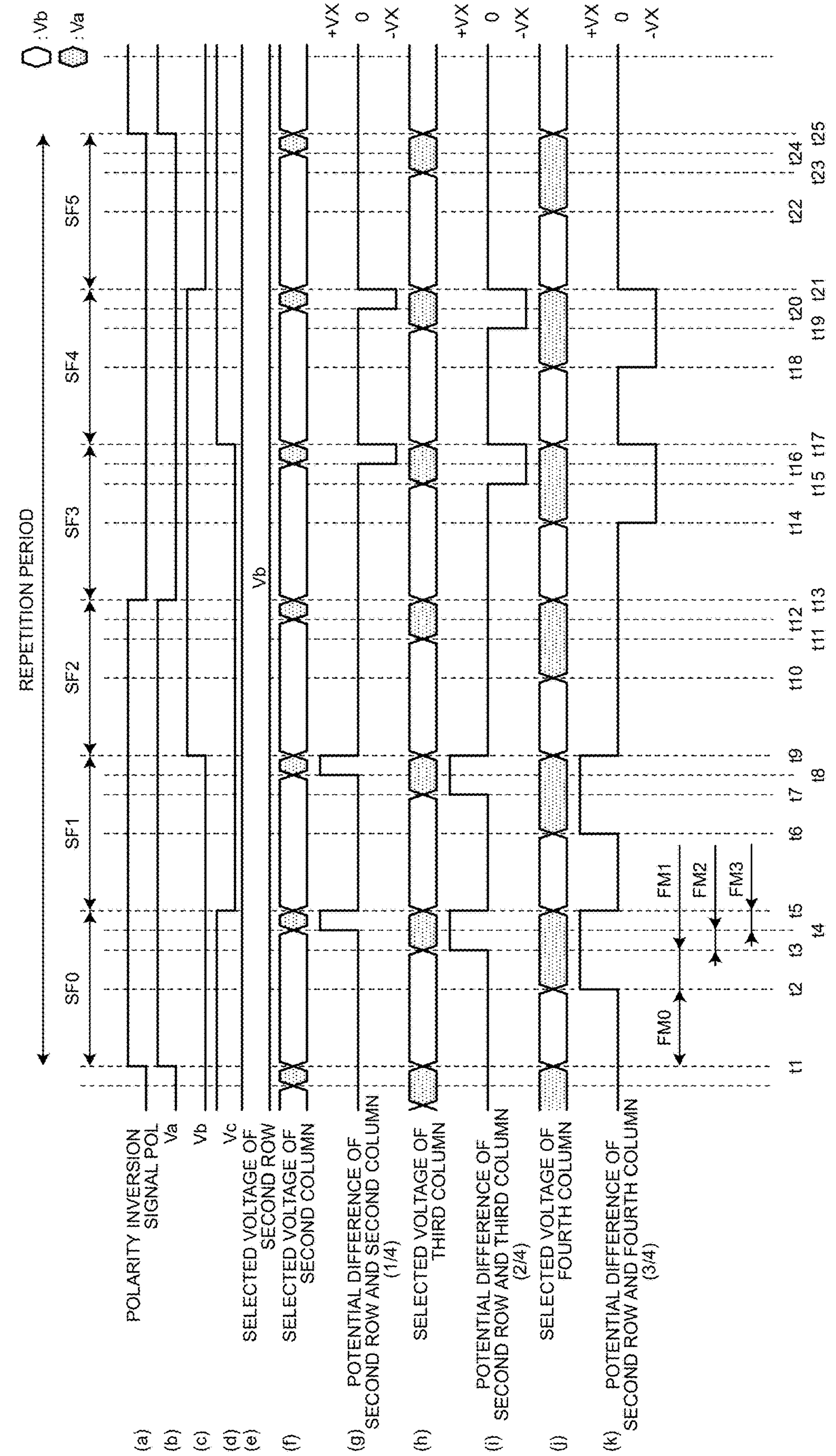
FIG. 12 is an operation timing chart (part 2) of the second embodiment.

FIG. 12 is an operation timing chart (part 2) of the second embodiment.

First, regarding the operation of the second embodiment, the operation of the second column corresponding to the column electrode EX2 is described.

Period Corresponding to Subframe SF0

In the period corresponding to the subframe SF0 (the time t1 to the time t5), the arithmetic circuit 24 applies the pattern voltage Vb to the row electrode EX2 as illustrated in Graph (e) of FIG. 12.

In addition, as illustrated in Graph (f) of FIG. 12, the arithmetic circuit 24 applies the pattern voltage Vb to the column electrode EY2 in a period from the time t1 to the time t4 among the period corresponding to the subframe SF0 and applies the pattern voltage Va to the column electrode EY2 in a period from the time t4 to the time t5.

Thus, to the dimming region R(2, 2), the pattern voltage Vb is applied from the corresponding row electrode EX2, and the pattern voltage Vb is applied from the corresponding column electrode EY2 at the time t1 to the time t4. Therefore, as illustrated in Graph (g) of FIG. 12, the potential difference is 0 volts in the period from the time t1 to the time t4.

Also, at the time t4 to the time t5, the pattern voltage Va is applied from the corresponding column electrode EY2. Therefore, as illustrated in Graph (g) of FIG. 12, the potential difference is +VX volts in the period from the time t4 to the time t5. Therefore, in the period corresponding to the subframe SF0, the relative on-period of the dimming region R(2, 2) is effectively set to the state of 0.9.

In addition, as illustrated in Graph (h) of FIG. 12, the arithmetic circuit 24 applies the pattern voltage Vb to the column electrode EY3 in a period from the time t1 to the time t3 among the period corresponding to the subframe SF0 and applies the pattern voltage Va to the column electrode EY3 in a period from the time t3 to the time t5.

Accordingly, to the dimming region R(2, 3), the pattern voltage Vb is applied in the period corresponding to the subframe SF0 from the corresponding row electrode EX3, the pattern voltage Vb is applied from the corresponding column electrode EY3 in the period from the time t1 to the time t3, and the pattern voltage Va is applied in the period from the time t3 to the time t5. Therefore, in the period of the subframe SF0, the potential difference in the period from the time t1 to the time t3 is 0 volts, and the potential difference in the period from the time t3 to the time t5 is +VX volts. Therefore, in the period corresponding to the subframe SF0, the relative on-period of the dimming region R(2, 3) is effectively set to the state of 0.8.

In addition, as illustrated in Graph (j) of FIG. 12, the arithmetic circuit 24 applies the pattern voltage Vb to the column electrode EY4 in a period from the time t1 to the time t2 among the period corresponding to the subframe SF0 and applies the pattern voltage Va to the column electrode EY4 in a period from the time t2 to the time t5.

Accordingly, to the dimming region R(2, 4), the pattern voltage Vb is applied in the period corresponding to the subframe SF0 from the corresponding row electrode EX2, the pattern voltage Vb is applied from the corresponding column electrode EY1 in the period from the time t1 to the time t2, and the pattern voltage Va is applied in the period from the time t2 to the time t5. Therefore, as illustrated in Graph (k) of FIG. 12, in the period of the subframe SF0, the potential difference in the period from the time t1 to the time t2 is 0 volts, and the potential difference in the period from the time t2 to the time t5 is +VX volts. Therefore, in the period corresponding to the subframe SF0, the relative on-period of the dimming region R(2, 4) is effectively set to the state of 0.6.

In addition, though not illustrated, the arithmetic circuit 24 applies the pattern voltage Va to the column electrode EY5 in a period corresponding to the subframe SF0.

Thus, to the dimming region R(2, 5), the pattern voltage Vb is applied from the corresponding row electrode EX2, and the pattern voltage Va is applied from the corresponding column electrode EY5. Therefore, the potential difference becomes +VX volts in all the periods of the subframe SF0. Therefore, in the period corresponding to the subframe SF0, the dimming region R(2, 5) is effectively set to the ON state (light-transmitting state).

Period Corresponding to Subframe SF1

In the second embodiment, the same operation as that of the subframe SF0 is performed also in the period (the time t5 to the time t9) corresponding to the subframe SF1, and thus the detailed description thereof is omitted.

Period Corresponding to Subframe SF2

Next, an operation in the subframe SF2 is described.

In the period corresponding to the subframe SF2 (the time t9 to the time t13), the arithmetic circuit 24 applies the pattern voltage Vb to the row electrode EX2 as illustrated in Graph (e) of FIG. 12.

In addition, as illustrated in Graph (f) of FIG. 12, the arithmetic circuit 24 applies the pattern voltage Vb to the column electrode EY2 in a period from the time t9 to the time t12 among the period corresponding to the subframe SF2 and applies the pattern voltage Va to the column electrode EY2 in a period from the time t12 to the time t13.

Thus, to the dimming region R(2, 2), the pattern voltage Vb is applied from the corresponding row electrode EX2, and the pattern voltage Vb is applied from the corresponding column electrode EY2 at the time t9 to the time t12. Therefore, as illustrated in Graph (g) of FIG. 12, the potential difference is 0 volts in the period from the time t9 to the time t12.

Also, at the time t12 to the time t13, the pattern voltage Va is applied from the corresponding column electrode EY2. Therefore, as illustrated in Graph (g) of FIG. 12, the potential difference is 0 volts in the period from the time t9 to the time t12. Therefore, in the period corresponding to the subframe SF2, the dimming region R(2, 2) is effectively set to the OFF state (light-shielding state).

In addition, as illustrated in Graph (h) of FIG. 12, the arithmetic circuit 24 applies the pattern voltage Vb to the column electrode EY3 in a period from the time t9 to the time t11 among the period corresponding to the subframe SF2 and applies the pattern voltage Va to the column electrode EY3 in a period from the time t11 to the time t13.

Accordingly, to the dimming region R(2, 3), the pattern voltage Vb is applied in the period corresponding to the subframe SF2 from the corresponding row electrode EX3, the pattern voltage Vb is applied from the corresponding column electrode EY3 in the period from the time t9 to the time t11, and the pattern voltage Va is applied in the period from the time t11 to the time t13. Therefore, the potential difference becomes 0 volts in all the periods of the subframe SF2. Therefore, in the period corresponding to the subframe SF2, the dimming region R(2, 3) is effectively set to the OFF state (light-shielding state).

In addition, as illustrated in Graph (j) of FIG. 12, the arithmetic circuit 24 applies the pattern voltage Vb to the column electrode EY4 in a period from the time t9 to the time t10 among the period corresponding to the subframe SF2 and applies the pattern voltage Va to the column electrode EY4 in a period from the time t10 to the time t13.

Accordingly, to the dimming region R(2, 4), the pattern voltage Vb is applied in the period corresponding to the subframe SF2 from the corresponding row electrode EX2, the pattern voltage Vb is applied from the corresponding column electrode EY1 in the period from the time t9 to the time t10, and the pattern voltage Va is applied in the period from the time t10 to the time t13. Therefore, as illustrated in Graph (k) of FIG. 12, the potential difference is 0 volts in all the periods of the subframe SF2. Therefore, in the period corresponding to the subframe SF2, the dimming region R(2, 4) is effectively set to the OFF state (light-shielding state).

In addition, though not illustrated, the arithmetic circuit 24 applies the pattern voltage Va to the column electrode EY5 in a period corresponding to the subframe SF2.

Thus, to the dimming region R(2, 5), the pattern voltage Vb is applied from the corresponding row electrode EX2, and the pattern voltage Va is applied from the corresponding column electrode EY5. Therefore, the potential difference becomes +VX volts in all the periods of the subframe SF2. Therefore, in the period corresponding to the subframe SF2, the dimming region R(2, 5) is effectively set to the ON state (light-transmitting state).

Period Corresponding to Subframe SF3

In addition, the period corresponding to the subframe SF3 (the time t13 to the time t17), the period corresponding to a subframe SF4 (the time t17 to the time t21), and the period corresponding to a subframe SF5 (the time t21 to t25) are waveforms in which the signs of the pattern voltages Va, Vb, and Vc and the sign of the potential difference in the periods corresponding to the subframe SF0, the subframe SF1, and the subframe SF2 are inverted, respectively, and thus detailed description thereof is omitted.

As described above, the same operation as that of the first embodiment can be performed in the control of the second embodiment.

(3) Third Embodiment

In the first embodiment and the second embodiment described above, the frame periods of the frames FM0 to FM3 in the repetition period are described as being constant, but since the speed of the ON/OFF operation of the dimming region of the dimming panel 21 that configures the dimming device 20 changes depending on the temperature, the same gradation display cannot be always performed when the ambient temperature changes.

Therefore, in the third embodiment, a temperature detection circuit 50 that detects the ambient temperature is provided, and constant gradation display can be always performed according to the ambient temperature.

Figure 13:
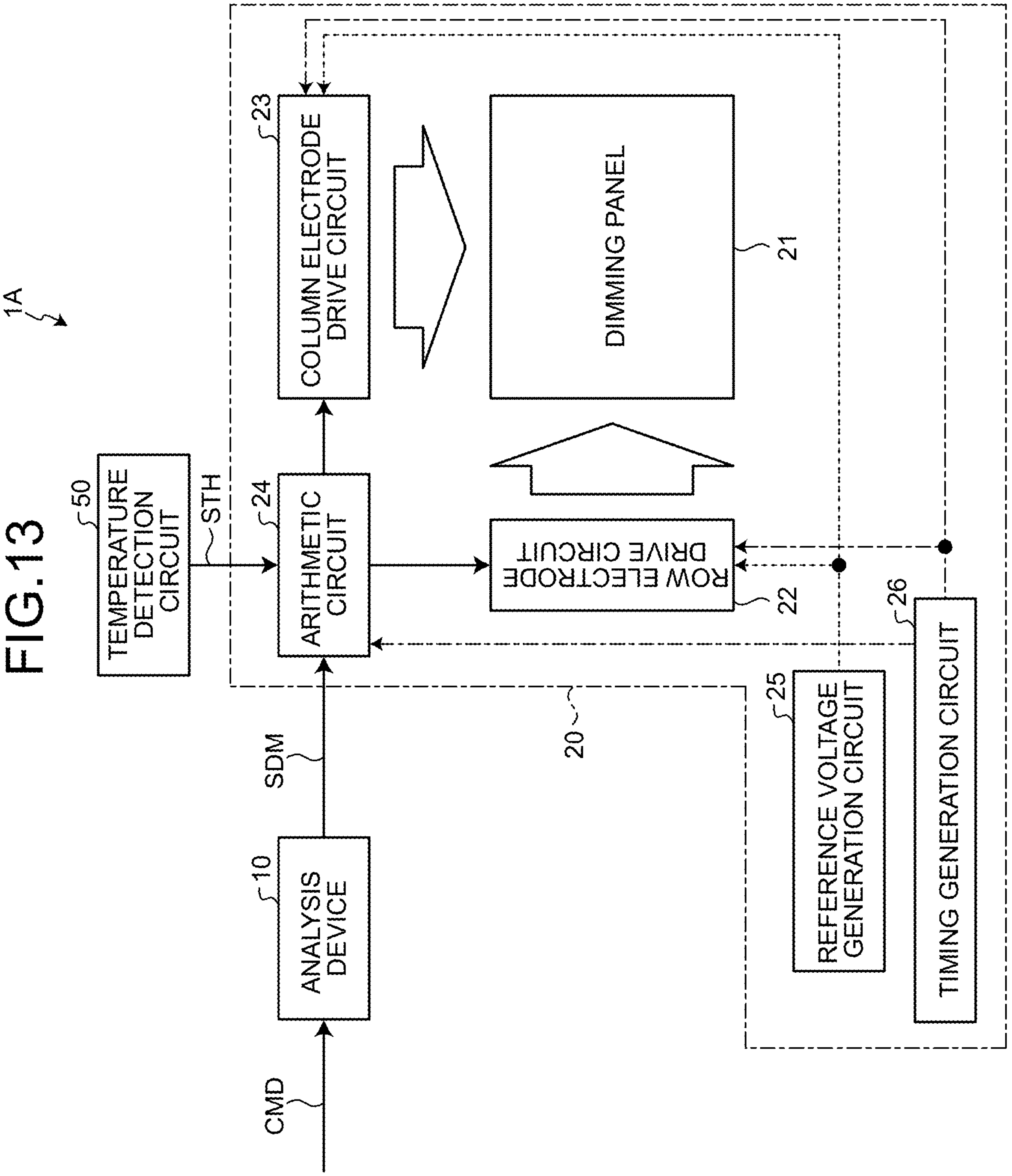
FIG. 13 is a schematic configuration block diagram of a dimming system including a dimming device of a third embodiment.

FIG. 13 is a schematic configuration block diagram of a dimming system including a dimming device of a third embodiment.

In FIG. 13, the same portions as those in FIG. 1 are denoted by the same reference numerals, and the detailed description thereof is incorporated.

A dimming system 1A of the third embodiment includes the temperature detection circuit 50, and the temperature detection circuit 50 outputs temperature data STH corresponding to the detected ambient temperature to the arithmetic circuit 24.

Figure 14:
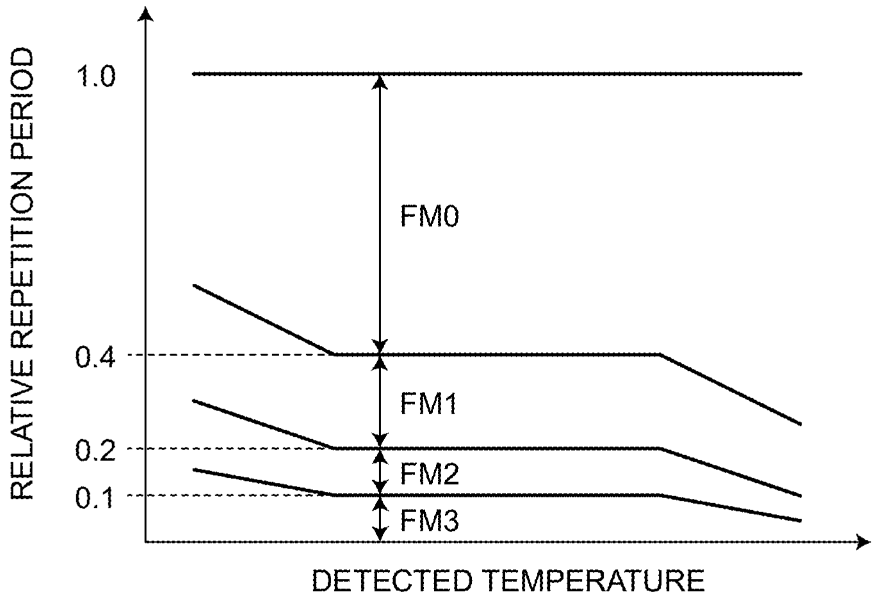
FIG. 14 is an operation explanatory diagram of the third embodiment.

FIG. 14 is an operation explanatory diagram of the third embodiment.

In FIG. 14, the vertical axis represents a relative ratio with respect to the repetition period of each frame period of the frame FM0 to the frame FM3.

In FIG. 14, a region indicated by an up-down arrow and having a constant relative ratio is a temperature region (normal temperature region) in which the ratio of the frame periods of the frame FM0 to the frame FM3 adopted in the first embodiment and the second embodiment corresponds to a case of $$FM0:FM1:FM2:FM3 = 0.6:0.2:0.1:0.1.$$

In the temperature region having a lower temperature than the normal temperature region (the region on the left side in FIG. 14), the arithmetic circuit 24 performs control to lower the ratio of the frame period of the frame FM0 and increase the ratio of the frame periods of the frame FM1 to the frame FM3, so that halftone display can be effectively performed as in the normal temperature region.

Meanwhile, in the temperature region having a higher temperature than the normal temperature region (the region on the right side in FIG. 14), the arithmetic circuit 24 performs control to raise the ratio of the frame period of the frame FM0 and decrease the ratio of the frame periods of the frame FM1 to the frame FM3, so that halftone display can be effectively performed as in the normal temperature region.

As a result, according to the third embodiment, even if the ambient temperature of the place where the dimming device 20 is installed changes, constant halftone display can be always performed.

Note that, although the same effect can be obtained even if the repetition period is lengthened, the concern of flicker increases, and thus, in the third embodiment, a method of changing the ratio of the frame periods while keeping the repetition period constant is adopted.

In the above description, a configuration in which only the ratio of the frame periods is changed is adopted, but in addition, constant halftone display can be always performed by changing the voltage applied to the dimming region.

(4) Fourth Embodiment

Figure 15:
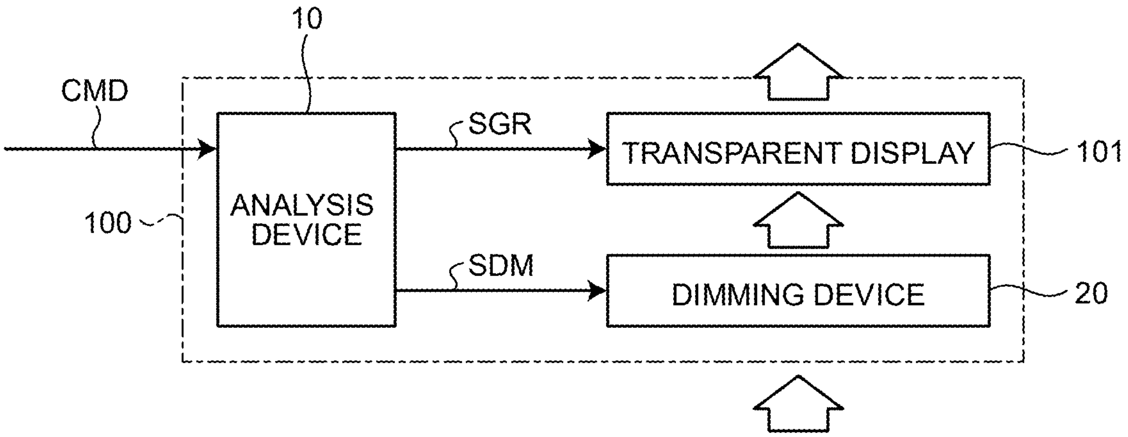
FIG. 15 is a schematic configuration block diagram illustrating a display device to which the dimming device according to the first to third embodiments is applied.

Note that the dimming device 20 according to the first to third embodiments can also be applied to a display device 100 as illustrated in FIG. 15.

FIG. 15 is a schematic configuration block diagram illustrating a display device to which the dimming device according to the first to third embodiments is applied.

The display device 100 includes the analysis device 10, a transparent display 101, and the dimming device 20.

The dimming device 20 is any of the dimming devices 20 according to the first to third embodiments.

The analysis device 10 has the same configuration as the analysis device 10 illustrated in FIG. 1 but is preferably configured to perform analysis optimized for the transparent display 101.

In the transparent display 101, unit regions having a transparent region and a light emitting region are two-dimensionally arranged. In each light emitting region, a plurality of light emitting pixels (for example, an R pixel, a G pixel, and a B pixel) are arranged. In the R pixel, the G pixel, and the B pixel, emission colors correspond to red (R), green (G), and blue (B), respectively. As a result, the transparent display 101 can display an image or transmit external light from the back surface as it is.

The analysis device 10 receives the request command CMD related to image display and dimming from a host controller, analyzes a request corresponding to the request command CMD, generates an image signal SGR, supplies the image signal SGR to the transparent display 101, generates the dimming signal SDM, and supplies the dimming signal SDM to the dimming device 20.

The transparent display 101 displays a predetermined image on the display screen according to the image signal SGR. Here, the image is not limited to a picture, a photograph, or the like and includes a character string or the like.

The dimming device 20 individually sets the plurality of dimming regions R to the light-transmitting state, the light-shielding state, or the halftone state according to the dimming signal SDM.

As a result, with respect to the image displayed on the transparent display 101, the image corresponding to the region set to the light-transmitting state by the dimming device 20 is displayed in the original color.

In addition, in the image displayed on the transparent display 101, the image corresponding to the region set to the light-shielding state by the dimming device is displayed dark and is almost invisible.

Furthermore, with respect to the image displayed on the transparent display 101, the image corresponding to the region set to the halftone state by the dimming device is displayed brighter or darker than other regions according to the halftone, whereby the region where the image desired to be focused on by the user is displayed can be displayed to be more conspicuous or blinking than other regions, or on the contrary, the region where the image including information that is not necessarily required is displayed can be displayed to be less conspicuous than other regions desired to be focused.

According to the dimming device and the display device of the present disclosure, dimming can be performed in halftone, and dimming performance can be improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A dimming device comprising:

a dimming panel that includes a plurality of row electrodes extending in a first direction, a plurality of column electrodes extending in a second direction intersecting the first direction, and a dimming layer disposed between the plurality of row electrodes and the plurality of column electrodes and having a plurality of dimming regions defined in a matrix form by the plurality of row electrodes and the plurality of column electrodes; and a controller that performs control to apply any of a plurality of pattern voltages having predetermined voltage waveforms to each of the plurality of row electrodes and the plurality of column electrodes according to a gradation of each of the plurality of dimming regions, wherein the controller selects a pattern voltage to be applied to each of the plurality of row electrodes and the plurality of column electrodes according to a gradation of each of the plurality of dimming regions in each of a plurality of frame periods that are periods different from each other and constitute a repetition period indicating a period serving as a unit, in units of which repetition for controlling dimming is performed.

2. The dimming device according to claim 1, wherein the controller performs control such that polarities of pattern voltages applied to frame periods are inverted between an even-numbered frame period and an odd-numbered frame period for each of the plurality of frame periods that constitute the repetition period.

3. The dimming device according to claim 1, wherein each of the plurality of pattern voltage is a binary signal and is set to have an identical effective value.

4. The dimming device according to claim 1, wherein a pattern of a difference voltage between two pattern voltages selected for one dimming region and applied in one frame period is set to transition between a voltage that brings the dimming region into a light-shielding state and a voltage that brings the dimming region into a light-transmitting state.

5. The dimming device according to claim 4, wherein the voltage that brings the dimming region into the light-shielding state is 0 volts.

6. The dimming device according to claim 1, wherein the controller receives a dimming signal for designating pattern voltages to be applied to the plurality of column electrodes, and designating, among the plurality of pattern voltages, pattern voltages to be supplied to the plurality of row electrodes, and generates column control signals and row control signals according to the dimming signal, and the dimming device further includes:

a column electrode drive circuit that drives the plurality of column electrodes according to the column control signals; and a row electrode drive circuit that drives the plurality of row electrodes according to the row control signals.

7. The dimming device according to claim 6, wherein the plurality of frame periods include a first frame period and a second frame period in which a polarity of a voltage waveform is inverted with respect to that in the first frame period, the controller further generates a polarity signal that indicates polarities of the plurality of frame periods, the column electrode drive circuit drives the plurality of column electrodes according to the column control signals and the polarity signal, and the row electrode drive circuit drives the plurality of row electrodes according to the row control signals and the polarity signal.

8. The dimming device according to claim 6, further comprising a reference voltage generation circuit that generates a reference voltage and supplies the reference voltage to each of the column electrode drive circuit and the row electrode drive circuit.

9. The dimming device according to claim 1, wherein the plurality of frame periods include frame periods having length different from each other.

10. The dimming device according to claim 4, wherein the controller performs intermediate gradation display by controlling a ratio of a length of period in which each dimming region is brought into the light-transmitting state in the repetition period.

11. The dimming device according to claim 1, wherein the controller changes ratios of lengths of the plurality of frame periods according to an ambient temperature.

12. A display device comprising:

a transparent display; and a dimming device that is disposed on a back surface side of the transparent display and is capable of controlling light transmittance, wherein the dimming device includes a dimming panel, the dimming panel includes:

a plurality of row electrodes extending in a first direction;

a plurality of column electrodes extending in a second direction intersecting the first direction;

a dimming layer having a plurality of dimming regions defined in a matrix form by the plurality of row electrodes and the plurality of column electrodes; and a controller that performs control to apply any of a plurality of pattern voltages having predetermined voltage waveforms to each of the plurality of row electrodes and the plurality of column electrodes according to a gradation of each of the plurality of dimming regions, and the controller selects a pattern voltage to be applied to each of the plurality of row electrodes and the plurality of column electrodes according to a gradation of each of the plurality of dimming regions in each of a plurality of frame periods that are periods different from each other and constitute a repetition period indicating a period serving as a unit, in units of which repetition for controlling dimming is performed.

* * * * *